United States Patent
Itabashi et al.

(10) Patent No.: US 7,903,134 B2
(45) Date of Patent: Mar. 8, 2011

(54) LASER SCANNING APPARATUS HAVING A PHOTODETECTOR HAVING FIRST AND SECOND LIGHT RECEIVING UNITS

(75) Inventors: Akihisa Itabashi, Tokyo (JP); Satoru Itoh, Kanagawa (JP); Mitsuo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/038,526

(22) Filed: Feb. 27, 2008

(65) Prior Publication Data

US 2008/0204846 A1 Aug. 28, 2008

(30) Foreign Application Priority Data

Feb. 28, 2007 (JP) ................ 2007-049212
Mar. 15, 2007 (JP) ................ 2007-066649
Apr. 19, 2007 (JP) ................ 2007-110399
Jul. 3, 2007 (JP) ................ 2007-174750
Dec. 27, 2007 (JP) ................ 2007-336232
Jan. 10, 2008 (JP) ................ 2008-003272

(51) Int. Cl.
*B41J 2/435* (2006.01)
*B41J 2/47* (2006.01)

(52) U.S. Cl. ........................ 347/235; 347/250

(58) Field of Classification Search ............ 347/229, 347/233–237, 246–250; 359/196.1; 250/236; 372/29.014
See application file for complete search history.

(56) References Cited

U.S. PATENT DOCUMENTS

| | | | |
|---|---|---|---|
| 4,618,958 A * | 10/1986 | Shibata et al. | 372/29.014 |
| 5,933,266 A * | 8/1999 | Minakuchi | 359/196.1 |
| 6,236,447 B1 * | 5/2001 | Yamada et al. | 355/53 |
| 6,381,057 B1 | 4/2002 | Itabashi | |
| 6,400,391 B1 | 6/2002 | Suhara et al. | |
| 6,429,956 B2 | 8/2002 | Itabashi | |
| 6,469,772 B1 | 10/2002 | Itabashi | |
| 6,580,186 B1 | 6/2003 | Suzuki et al. | |
| 6,596,985 B2 | 7/2003 | Sakai et al. | |
| 6,624,920 B2 | 9/2003 | Itabashi | |
| 6,700,687 B1 | 3/2004 | Itabashi | |
| 6,747,818 B2 | 6/2004 | Ohashi et al. | |

(Continued)

FOREIGN PATENT DOCUMENTS

JP  2002-131662  5/2002

(Continued)

OTHER PUBLICATIONS

U.S. Appl. No. 11/710,907, filed Feb. 27, 2007, Taku Amada, et al.

(Continued)

*Primary Examiner* — Hai C Pham
(74) *Attorney, Agent, or Firm* — Oblon, Spivak, McClelland, Maier & Neustadt, L.L.P.

(57) ABSTRACT

Each light detecting sensor, which is installed corresponding to each photoconductor drum, and to which the plurality of light beams passing through the scanning optical system are incident while moving in a main scanning direction includes a light-receiving device having a first light-receiving unit and a second light-receiving unit, which have different intervals from each other in the main scanning direction depending on a position of a sub-scanning direction, all the sizes of the first and the second light-receiving units being sizes covering an overall virtual area in a quadrangular shape surrounding a plurality of light spots in the light-receiving surface.

22 Claims, 35 Drawing Sheets

U.S. PATENT DOCUMENTS

| | | |
|---|---|---|
| 6,768,506 B2 | 7/2004 | Hayashi et al. |
| 6,771,407 B2 | 8/2004 | Hayashi et al. |
| 6,778,203 B2 | 8/2004 | Itami et al. |
| 6,785,028 B1 | 8/2004 | Atsuumi et al. |
| 6,791,596 B2 | 9/2004 | Nihei et al. |
| 6,822,775 B2 | 11/2004 | Suzuki et al. |
| 6,825,457 B2 * | 11/2004 | Sakamoto .................. 250/236 |
| 6,839,157 B2 | 1/2005 | Ono et al. |
| 6,932,271 B2 | 8/2005 | Nakajima et al. |
| 7,006,271 B2 | 2/2006 | Ono et al. |
| 7,045,773 B2 | 5/2006 | Suzuki et al. |
| 7,050,080 B2 | 5/2006 | Ema et al. |
| 7,050,082 B2 | 5/2006 | Suzuki et al. |
| 7,075,563 B2 | 7/2006 | Itabashi |
| 7,167,288 B2 | 1/2007 | Miyatake et al. |
| 7,280,129 B2 * | 10/2007 | Takada ...................... 347/235 |
| 2004/0032631 A1 | 2/2004 | Amada et al. |
| 2005/0024479 A1 | 2/2005 | Itabashi et al. |
| 2005/0179971 A1 | 8/2005 | Amada et al. |
| 2006/0132880 A1 | 6/2006 | Amada et al. |
| 2007/0019269 A1 | 1/2007 | Itabashi |
| 2007/0206256 A1 | 9/2007 | Itabashi |
| 2007/0236557 A1 | 10/2007 | Imai et al. |

FOREIGN PATENT DOCUMENTS

| | | |
|---|---|---|
| JP | 2005-234510 | 9/2005 |
| JP | 2006-116716 | 5/2006 |
| JP | 2006-350167 | 12/2006 |

OTHER PUBLICATIONS

U.S. Appl. No. 11/850,568, filed Sep. 5, 2007, Unknown.

U.S. Appl. No. 11/855,883, filed Sep. 14, 2007, Unknown.

* cited by examiner

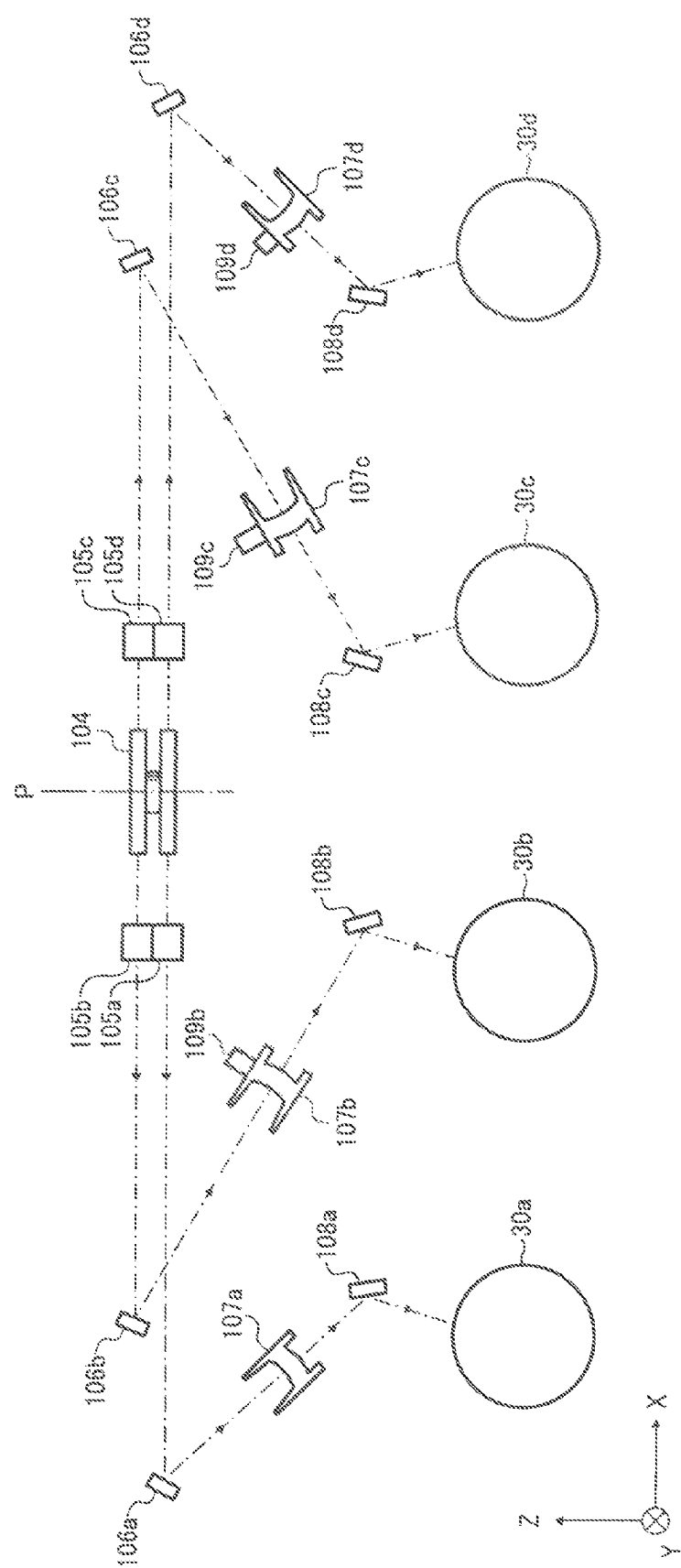

MOVING DIRECTION OF
DETECTION BEAM

FIG. 22
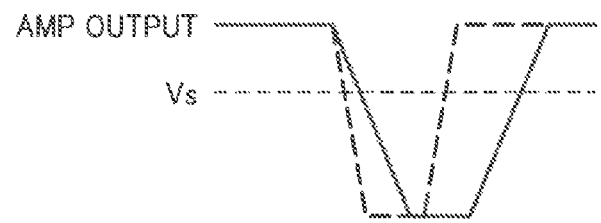
FIG. 23
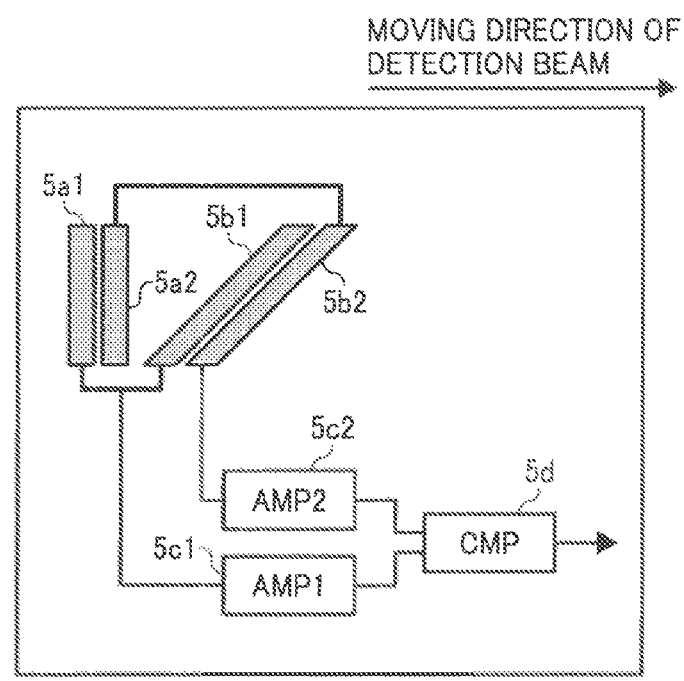

FIG. 24
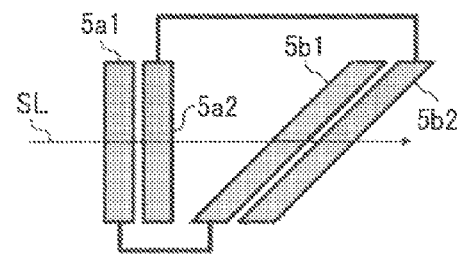
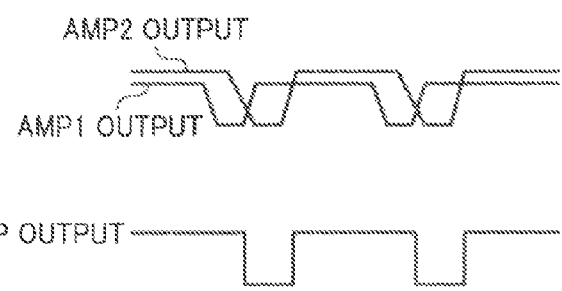
FIG. 25
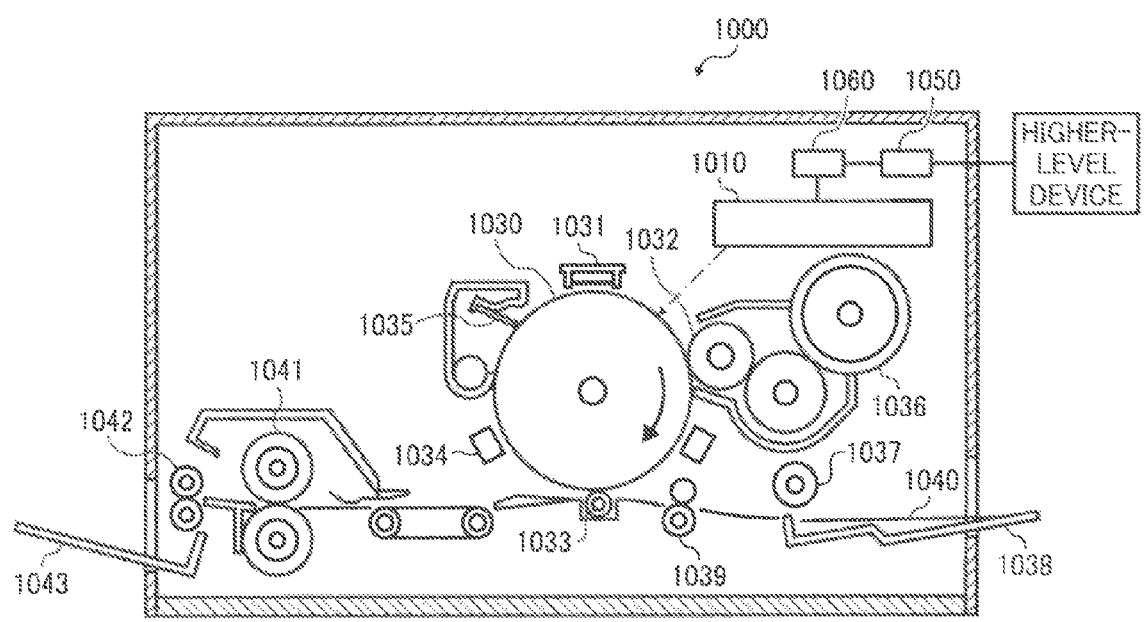

MOVING DIRECTION OF
SYNCHRONOUS DETECTION BEAMS

MOVING DIRECTION OF
SYNCHRONOUS DETECTION BEAMS

MOVING DIRECTION OF
DETECTION BEAM

FIG. 43
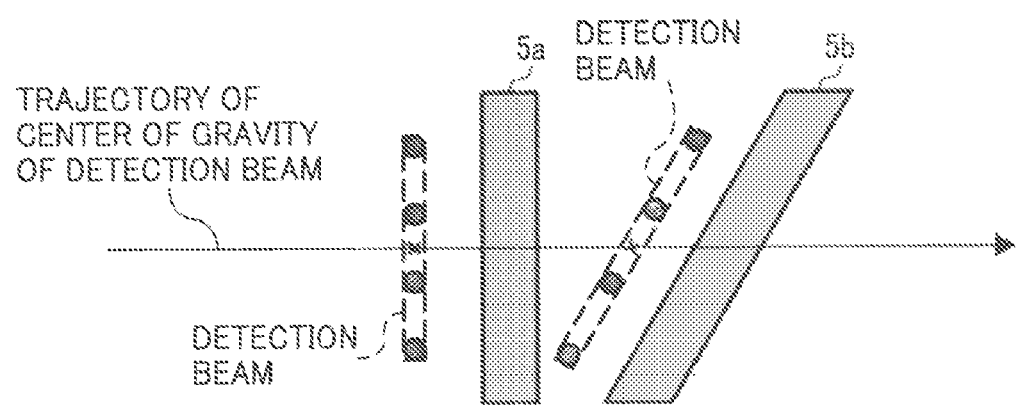
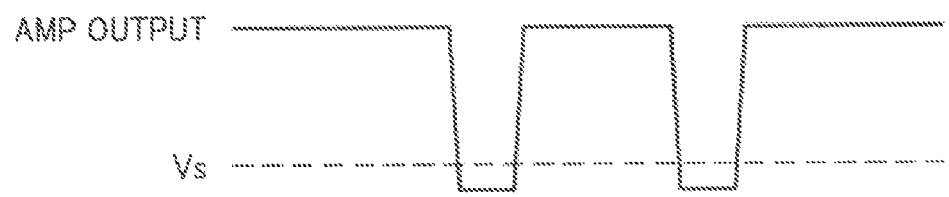
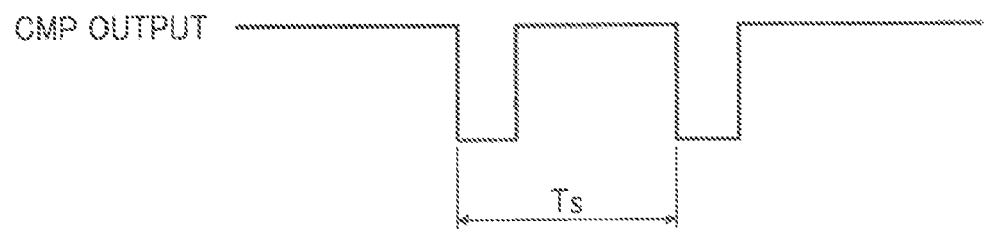

LASER SCANNING APPARATUS HAVING A PHOTODETECTOR HAVING FIRST AND SECOND LIGHT RECEIVING UNITS

CROSS-REFERENCE TO RELATED APPLICATIONS

The present application claims priority to and incorporates by reference the entire contents of Japanese priority documents 2007-049212, filed in Japan on Feb. 28, 2007; 2007-110399, filed in Japan on Apr. 19, 2007; and 2008-003272, filed in Japan on Jan. 10, 2008 which claims the benefit of priority from priority documents 2007-066649, filed in Japan on Mar. 15, 2007; 2007-174750, filed in Japan on Jul. 3, 2007; and 2007-336232, filed in Japan on Dec. 27, 2007.

BACKGROUND OF THE INVENTION

1. Field of the Invention

The present invention relates to a laser scanning apparatus and an image forming apparatus, and more specifically, to a laser scanning apparatus for scanning a surface to be scanned with beams and an image forming apparatus having the laser scanning apparatus.

2. Description of the Related Art

Conventionally, an image forming apparatus using a laser has been widely used for recording an electrophotographic image. In this case, the image forming apparatus includes a laser scanning apparatus and generally uses a method that forms latent image by a rotation of a drum while scanning laser beam to an axial direction of a photosensitive drum using a polygon scanner (for example, a polygon mirror). In the field of the electrophotograph, the image forming apparatus capable of realizing high density image for improving image quality and of outputting image at high speed for improving operability is needed.

As a method capable of achieving the high density and the high speed, a so-called multibeam that simultaneously scans a surface of the drum with a plurality of beams is proposed.

In Japanese Patent Application Laid-Open No. 2002-131662, for example, a laser scanning apparatus is disclosed, including a light source that has a plurality of light emitting devices two-dimensionally arranged; an optical sensor that is capable of detecting light beams deflected by a deflection unit to scan a surface to be scanned emitted from the light source at a particular position within a scanning range of the light beams; a generating unit that generates synchronous signals whose signal levels are varied according to an amount of light energy received in the optical sensor; and a controller that light beams each of the light emitting devices, within a period where the light beams emitted from the plurality of light emitting devices traverse a light-receiving surface of the optical sensor, the light emitting devices being previously selected as light emitting devices used for generating the synchronous signals and positions of the light emitting devices along a scanning direction of light spots formed on the surface to be scanned by the emitted light beams being almost equal to one another.

In Japanese Patent Application Laid-Open No. 2006-350167, a laser scanning apparatus is provided, comprising: a light source that emits a plurality of beams; a coupling optical system that couples the plurality of beams with a subsequent optical system; an optical deflection unit that deflects the plurality of beams to a main scanning direction; and a scanning optical system that images the plurality of beams deflected by the deflection unit on a surface to be scanned, the light source having a plurality of openings that limits a plurality of light emitting areas in surface emitting lasers where plurality of the light emitting areas are arranged in a form of a two-dimensional array, the plurality of openings having a one-to-one arrangement corresponding to each light emitting area, and if Dm is a width of the main scanning direction of the opening, Ds is a width in a sub-scanning direction of the opening, $\beta m$ is magnification in the main scanning direction of the overall optical system, $\beta s$ is magnification in the sub-scanning direction of the overall optical system, $\omega m$ is a light spot size in the scanning direction formed on the surface to be scanned, and $\omega s$ is a light spot size in the sub-scanning direction formed on the surface to be scanned, the scanning optical system satisfying conditions of $Dm \cdot |\beta m| < \omega m$ and $Ds \cdot |\beta s| < \omega s$.

In recent years, the image forming apparatus is used in a simple printing as an on-demand printing system so that image quality of higher definition is demanded.

In the laser scanning apparatus that obtains synchronous signals of a scan start, etc. by receiving beams for synchronization formed of a plurality of beams in a light-receiving device, the scanning position of the beams for synchronization deviates from the sub-scanning direction due to a machining error or an assembling error of an optical device to reduce light intensity of the beams for synchronization received in the light-receiving device so that the predetermined synchronous signals are not obtained and the synchronous signals are unstable.

SUMMARY OF THE INVENTION

It is an object of the present invention to at least partially solve the problems in the conventional technology.

According to an aspect of the present invention, a laser scanning apparatus includes a light source unit including a plurality of light emitters; a deflector for deflecting a light beam from the light source unit; a scanning optical system for condensing the light beam deflected by the deflector on a surface to be scanned; and a photo detector to which a plurality of light beams which are deflected by the deflector and pass through the scanning optical system are incident while moving in a main scanning direction, and which includes at least one light-receiving device having a first light-receiving unit and a second light-receiving unit, the first light-receiving unit and the second light-receiving unit being placed in different intervals from each other in the main scanning direction depending on a position in a direction orthogonal to the main scanning direction in a light-receiving surface. Every size of the first and the second light-receiving units is a size covering an overall virtual area in a quadrangular shape surrounding a plurality of light spots in the light-receiving surface of the photo detector.

According to another aspect of the present invention, a laser scanning apparatus includes at least one light source unit including a plurality of light emitters; a deflector for deflecting a light beam from the at least one light source unit; a scanning optical system for condensing the light beam deflected by the deflector on a plurality of surfaces to be scanned; and a plurality of photo detectors provided corresponding respectively to the plurality of surfaces to be scanned. A plurality of light beams which are deflected by the deflector and pass through the scanning optical system are incident to each photo detector while the photo detector moves in a main scanning direction. The photo detector includes at least one light-receiving device having a first light-receiving unit and a second light-receiving unit. The first light-receiving unit and the second light-receiving unit are placed in different intervals from each other in the main scanning direction depending on a position in a direction orthogonal to the main scanning direction in a light-receiving surface. Every size of the first and the second light-receiving units is a size covering an overall virtual area in a quadrangular shape surrounding a plurality of light spots in the light-receiving surface of the photo detector.

According to still another aspect of the present invention, an image forming apparatus includes at least one image carrier; and the laser scanning apparatus according to the present invention for scanning beams including image information on the at least one image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a side view showing a configuration example of the laser scanning apparatus in FIG. 1;

FIG. 22 is a view illustrating a change in a waveform in output signals from an amplifier;

FIG. 23 is a view illustrating a modification of the light detecting sensor;

FIG. 24 is a view illustrating the output signals from the light detecting sensor of FIG. 23;

FIG. 25 is a view illustrating a schematic configuration of a laser printer according to a second embodiment of the present invention;

FIG. 43 is a view illustrating an operation of the synchronization detecting sensor before scanning.

DETAILED DESCRIPTION OF THE PREFERRED EMBODIMENTS

Hereinafter, exemplary embodiments for practicing the present invention will be explained.

Figure 1:
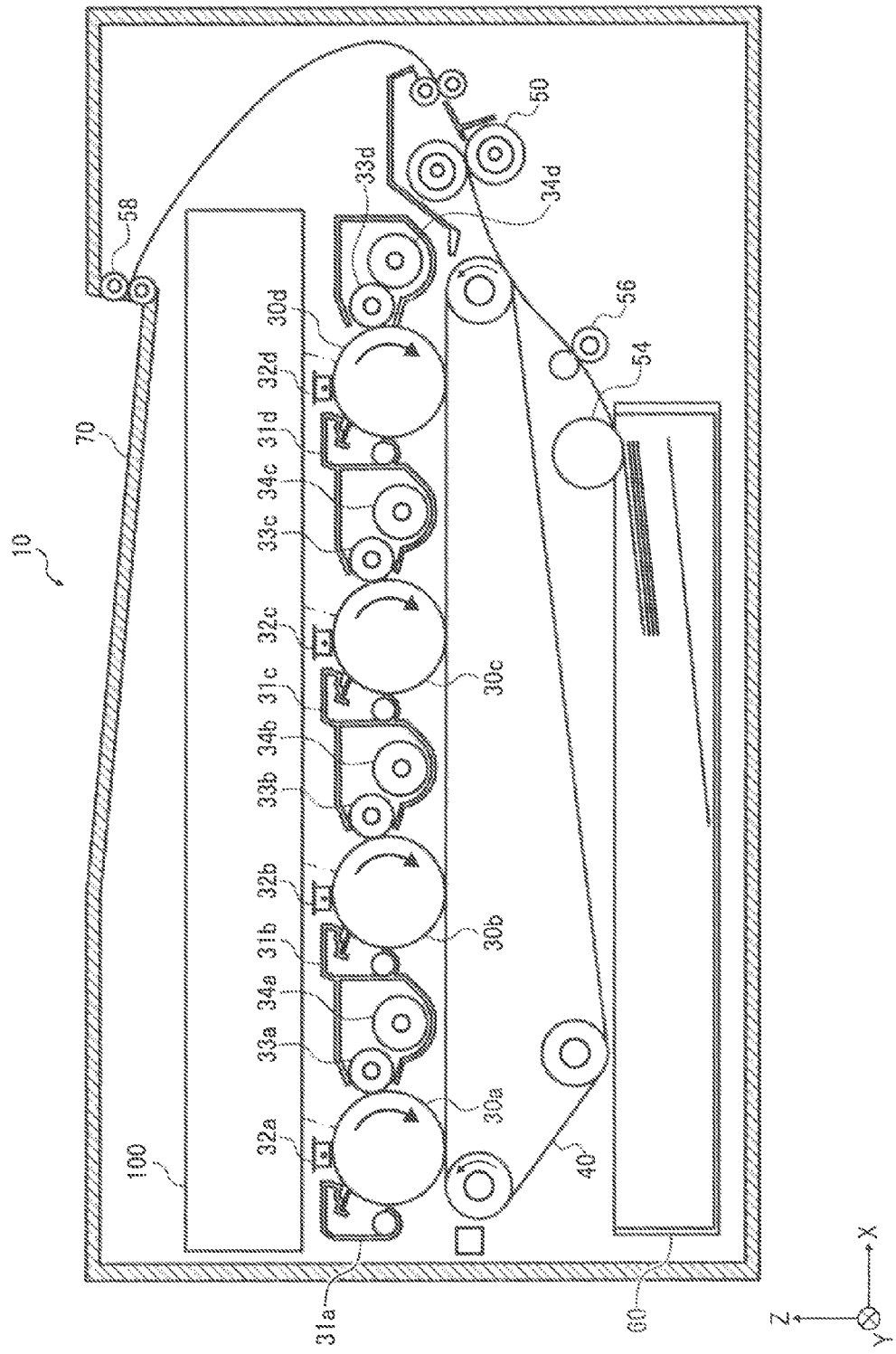
FIG. 1 is a view illustrating a schematic configuration of a printer according to a first embodiment of the present invention.

Hereinafter, a first embodiment of the present invention will be explained with reference to FIGS. 1 to 14. FIG. 1 is a schematic view showing a configuration of a printer 10 according to a first embodiment of the present invention. The present specification will describe a main scanning direction as a Y-axis direction, a sub-scanning direction as a Z-axis direction, and a direction orthogonal thereto as an X-axis direction.

In the present specification, a diameter of a light spot refers to a diameter of an area having light intensity equal to or more than $1/e^2$ when central light intensity is 1.

The printer 10, which is a multicolor printer in a tandem manner that forms an image of a full color by superposing four colors (black, cyan, magenta, yellow), includes a laser scanning apparatus 100, four photoconductor drums 30a, 30b, 30c, and 30d, four electrifying chargers 32a, 32b, 32c, and 32d, four developing rollers 33a, 33b, 33c, and 33d, four toner cartridges 34a, 34b, 34c, and 34d, four cleaning cases 31a, 31b, 31c, and 31d, a transfer belt 40, a paper feeding tray 60, a paper feeding roller 54, a resist roller pair 56, a fixing roller 50, a paper exiting tray 70, a paper exiting roller 58, and a printer controller (not shown) that collectively controls each unit.

The photoconductor drum 30a, the electrifying charger 32a, the developing roller 33a, the toner cartridge 34a, and the cleaning case 31a are used as a set to configure an image forming station (hereinafter, also referred to as a K station for convenience) that forms a black image.

The photoconductor drum 30b, the electrifying charger 32b, the developing roller 33b, the toner cartridge 34b, and the cleaning case 31b are used as a set to configure an image forming station (hereinafter, also referred to as a C station for convenience) that forms a cyan image.

The photoconductor drum 30c, the electrifying charger 32c, the developing roller 33c, the toner cartridge 34c, and the cleaning case 31c are used as a set to configure an image forming station (hereinafter, also referred to as a M station for convenience) that forms a magenta image.

The photoconductor drum 30d, the electrifying charger 32d, the developing roller 33d, the toner cartridge 34d, and the cleaning case 31d are used as a set to configure an image forming station (hereinafter, also referred to as a Y station for convenience) that forms a yellow image.

All the photoconductor drums have a photosensitive layer formed on a surface thereof. In other words, the surface of the photoconductor drum is a surface to be scanned. Each photoconductor drum uses a length direction as the Y-axis direction and is equidistantly arranged with respect to the X-axis direction. Each photoconductor drum rotates in an arrow direction in the surface of FIG. 1 by a rotation mechanism (not shown).

The electrifying chargers uniformly charge the surfaces of the corresponding photoconductor drums, respectively.

The laser scanning apparatus 100 irradiates the surface of corresponding charged photoconductor drums with light modulated for each color based on multicolor image information (black image information, cyan image information, magenta image information, yellow image information) from a higher-level device (for example, a personal computer). As a result, in each surface of the photoconductor drums, charges are lost by a portion irradiated with light and latent images corresponding to the image information are formed on the surfaces of each photoconductor drums, respectively. The formed latent images move in a direction of the corresponding developing roller according to a rotation of the photoconductor drum. A configuration of the laser scanning apparatus 100 will be explained below.

The toner cartridge 34a receives a black toner and supplies it to the developing roller 33a. The toner cartridge 34b receives a cyan toner and supplies it to the developing roller 33b. The toner cartridge 34c receives a magenta toner and supplies it to the developing roller 33c. The toner cartridge 34d receives a yellow toner and supplies it to the developing roller 33d.

Each developing roller thinly and uniformly applies the toner from the corresponding toner cartridge on the surface according to the rotation thereof. If the toner on the surface of each developing roller contacts the surface of the corresponding photoconductor drum, the toner moves only to a portion on the surface irradiated with light so that it is attached thereto. In other words, each developing roller attaches the toner to the latent image formed on the surface of the corresponding photoconductor drum and develops it. The image to which the toner is attached (hereinafter, refer to as a toner image) moves in a direction of the transfer belt 40 according to the rotation of the photoconductor drum.

Each toner image of black, cyan, magenta, and yellow is sequentially transferred and superposed on the transfer belt 40 at a predetermined timing, forming the color images.

The paper feeding tray 60 receives recording papers. The paper feeding roller 54 is disposed near the paper feeding tray 60 and the paper feeding roller 54 takes out the recording papers by one sheet from the paper feeding tray 60 and conveys it to the resist roller pair 56. The resist roller pair 56 sends out the recording papers toward the transfer belt 40 at a predetermined timing. Thereby, the color images on the transfer belt 40 are transferred to the recording papers. Herein, the recording papers with the transferred images are sent to the fixing roller 50.

The fixing roller 50 applies heat and pressure to the recording papers so that the toner is fixed to the recording papers. The recording papers with the fixed toner are sent to the paper exiting tray 70 through the paper exiting roller 58 so that they are sequentially stacked on the paper exiting tray 70.

Each cleaning case removes the toner (a residual toner) remained on the surface of the corresponding photoconductor drum. The surface of the photoconductor drum where the residual toner is removed returns to the position of the corresponding electrifying charger again.

Hereinafter, a configuration of the laser scanning apparatus 100 will be explained.

Figure 2:
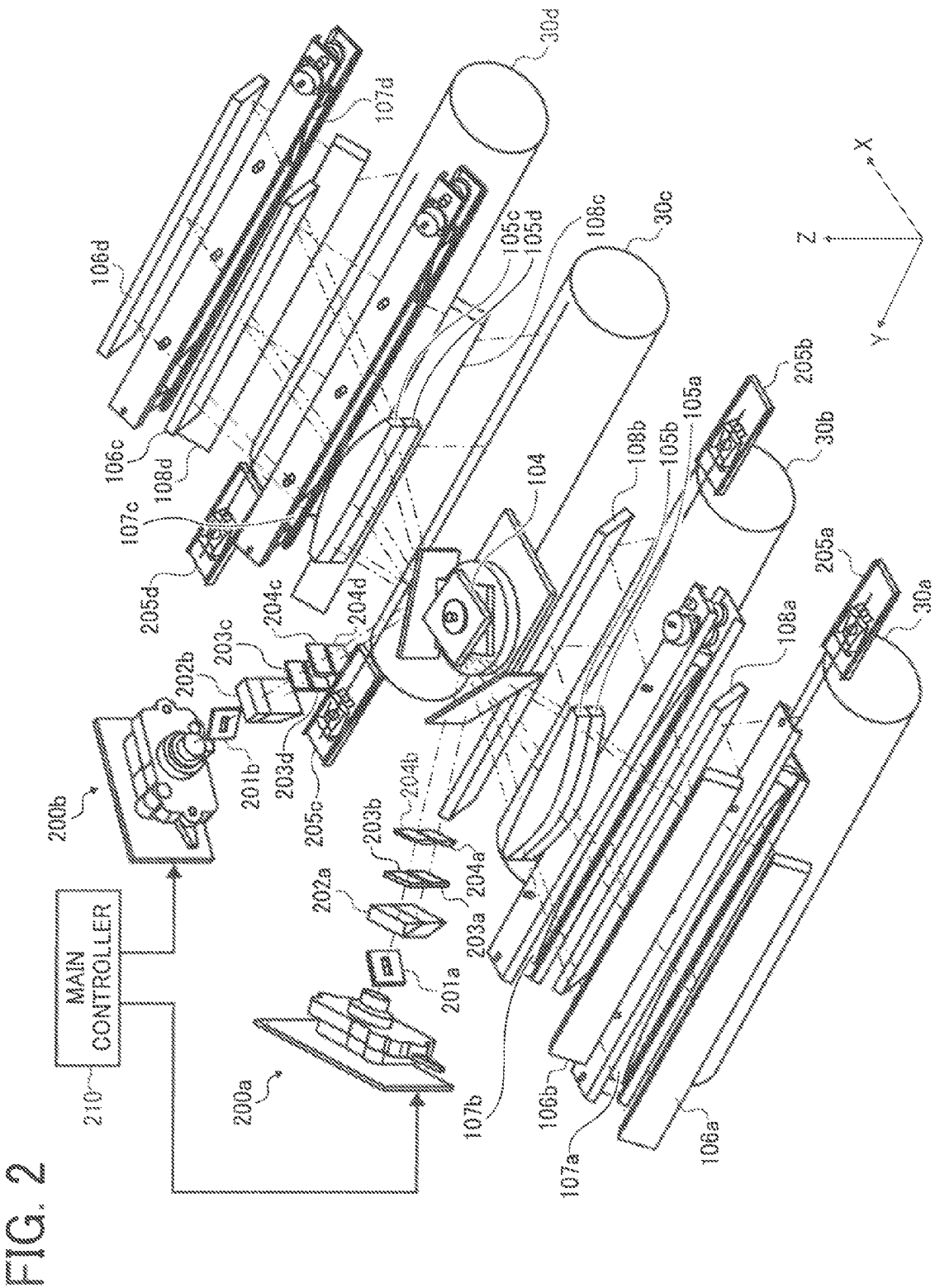
FIG. 2 is a perspective view showing a configuration example of a laser scanning apparatus in FIG. 1.

As shown in FIG. 2 as one example, the laser scanning apparatus 100 includes two light source units 200a and 200b, two opening plates 201a and 201b, two beam splitting prisms 202a and 202b, four liquid crystal deflecting devices 203a, 203b, 203c, and 203d, four cylinder lenses 204a, 204b, 204c, and 204d, a polygon mirror 104, four fθ lenses 105a, 105b, 105c, and 105d, eight folding mirrors 106a, 106b, 106c, 106d, 108a, 108b, 108c, and 108d, four troidal lenses 107a, 107b, 107c, and 107d, four light detecting sensors 205a, 205b, 205c, and 205d, and a main controller 210, etc.

Each light source unit includes a laser array and a coupling lens that makes light beams from the laser array almost parallel light beams.

Figure 3:
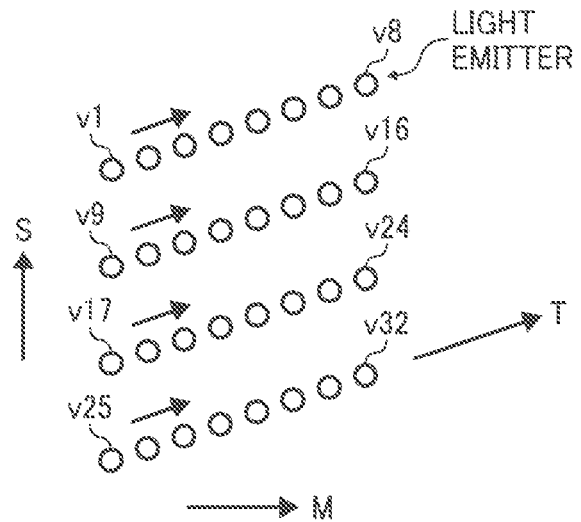
FIG. 3 is a view illustrating an arrangement example of a laser array in each light source unit in FIG. 2.

The laser array for example is a surface light emitting type semiconductor laser array in which thirty two light emitters are formed on one substrate and as shown in FIG. 3, has four arrays of light emitters where eight light emitters are equidistantly arranged along an inclined direction (hereinafter, also referred to as a T direction for convenience) from a direction (hereinafter, also referred to as a M direction for convenience) corresponding to the main scanning direction toward a direction (hereinafter, also referred to as an S direction for convenience) corresponding to the sub-scanning direction. The four arrays of light emitters are equidistantly arranged in the S direction so that the thirty two light emitters are equidistantly arranged with respect to the S direction. In other words, the thirty two light emitters are two-dimensionally arranged along the T direction and the S direction, respectively. In the present specification, an interval of the light emitters is a distance between the centers of two light emitters. Therefore, it is possible to simultaneously scan each photoconductor drum with thirty two light beams.

Here, arrays are called an array of a first light emitter, an array of a second light emitter, an array of a third light emitter, an array of a fourth light emitter from the top one toward the bottom one in FIG. 3 for convenience. To specify each light emitter, eight light emitters constituting the array of the first light emitter are called v1 to v8, eight light emitters constituting the array of the second light emitter v9 to v16, eight light emitters constituting the array of the third light emitter v17 to v24, and eight light emitters constituting the array of the fourth light emitter v25 to v32, from left toward right in FIG. 3 for convenience.

Returning to FIG. 2, the opening plate 201a has the openings and defines a beam diameter of light from the light source unit 200a. The opening plate 201b has the opening and defines a beam diameter of light from the light source unit 200b.

Figure 4:
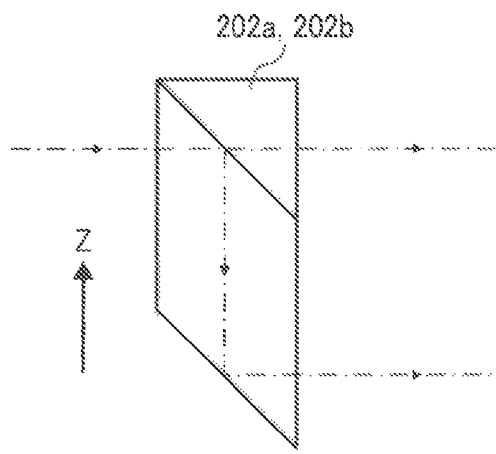
FIG. 4 is a view illustrating an action of each beam splitting prism in FIG. 2.

Each beam splitting prism includes a half mirror surface that transmits the half of incident beam and reflects the remaining beam and a mirror surface parallelly arranged to the half mirror surface on an optical path of light reflected from the half mirror surface, as shown in FIG. 4. In other words, each beam splitting prism splits the incident beam into two light beams parallel to each other.

The beam splitting prism 202a splits light passing through the opening of the opening plate 201a into two light beams that have the predetermined intervals in a Z-axis direction and are parallel to each other. The beam splitting prism 202b splits light passing through the opening of the opening plate 201b into two light beams that have the predetermined intervals in a Z-axis direction and are parallel to each other.

Figure 5:
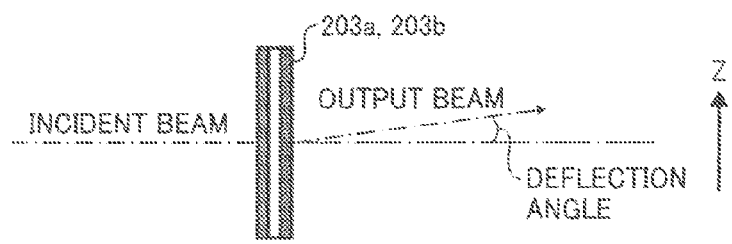
FIG. 5 is a view illustrating an action of each liquid crystal deflecting device in FIG. 2.
Figure 6:
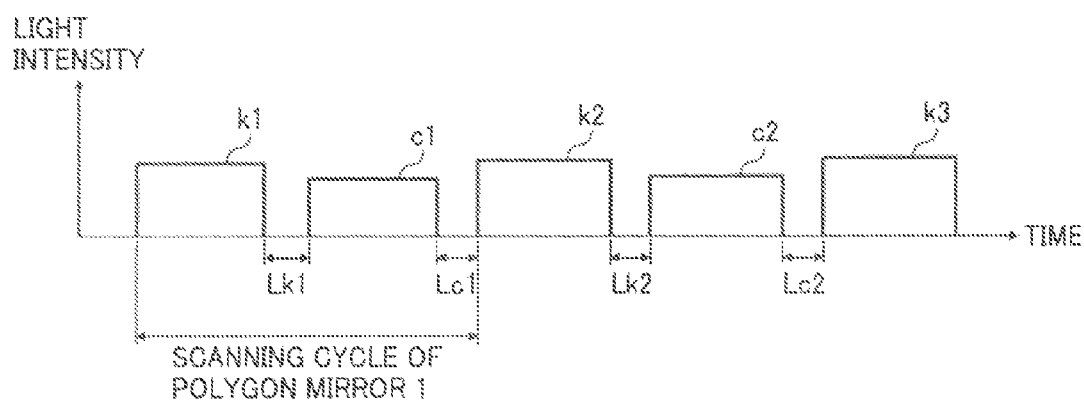
FIG. 6 is a timing chart showing time variation of writing light intensity in the light source unit.

Each liquid crystal device is capable of inclining an injecting shaft of light according to applied potential with respect to the sub-scanning direction (see FIG. 5).

The liquid crystal deflection device 203a is arranged on the optical path of −Z-axis light (hereinafter, referred to as black light for convenience) of two light beams from the beam splitting prism 202a, making it possible to deflect the black light to the sub-scanning direction according to applied voltage.

The liquid crystal deflection device 203b is arranged on the optical path of +Z-axis light (hereinafter, also referred to as cyan light for convenience) of two light beams from the beam splitting prism 202a, making it possible to deflect the cyan light to the sub-scanning direction according to applied voltage.

The liquid crystal deflection device 203c is arranged on the optical path of +Z-axis light (hereinafter, also referred to as magenta light for convenience) of two light beams from the beam splitting prism 202b, making it possible to deflect the magenta light to the sub-scanning direction according to applied voltage.

The liquid crystal deflection device 203d is arranged on the optical path of −Z-axis light (hereinafter, also referred to as yellow light for convenience) of two light beams from the beam splitting prism 202b, making it possible to deflect the yellow light to the sub-scanning direction according to applied voltage.

The cylinder lens 204a is arranged on the optical path of light (black light) through the liquid crystal deflection device 203a to converge the black light to the sub-scanning direction near the deflection reflecting surface of the polygon mirror 104.

The cylinder lens 204b is arranged on the optical path of light (cyan light) through the liquid crystal deflection device 203b to converge the cyan light to the sub-scanning direction near the deflection reflecting surface of the polygon mirror 104.

The cylinder lens 204c is arranged on the optical path of light (magenta light) through the liquid crystal deflection device 203c to converge the magenta light to the sub-scanning direction near the deflection reflecting surface of the polygon mirror 104.

The cylinder lens 204d is arranged on the optical path of light (yellow light) through the liquid crystal deflection device 203d to converge the yellow light to the sub-scanning direction near the deflection reflecting surface of the polygon mirror 104.

The polygon mirror 104 has four mirrors in a second stage structure, each mirror being the deflection reflecting surface. The first stage (a lower stage) deflection reflecting surface is arranged to deflect light beams from the cylinder lens 204a and light beams from the cylinder lens 204d, respectively and the second stage (an upper stage) deflection reflecting surface is arranged to deflect light beams from the cylinder lens 204b and light beams from the cylinder lens 204c, respectively. The first stage deflection reflecting surface and the second stage deflection reflecting surface rotate deviating by 45° in a phase to each other, thereby alternately performing the scanning of light in the first stage and the second stage (see FIG. 6).

Figure 7A:
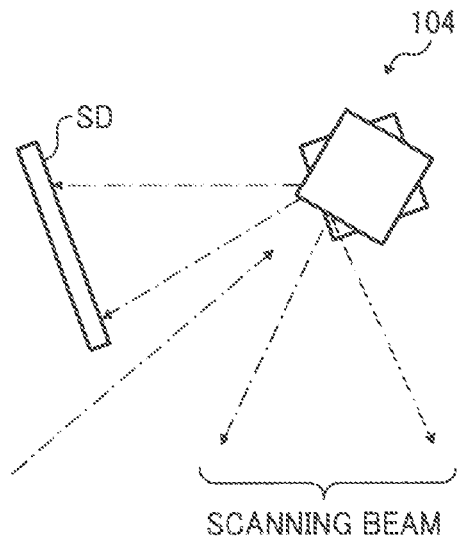
FIGS. 7A and 7B are each a view illustrating a light shielding plate.
Figure 7B:
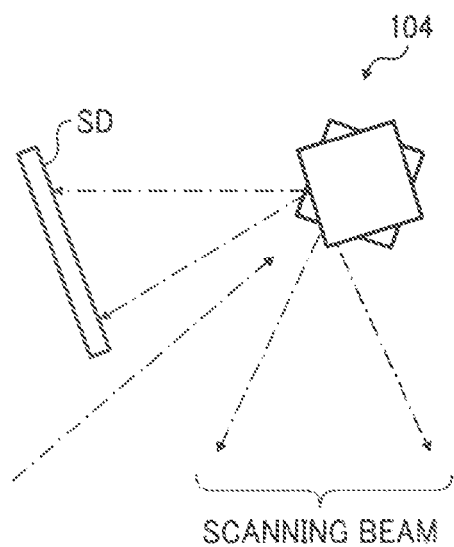

As shown in FIG. 7A as one example, the light shielding plate SD is mounted so that when the light beams deflected in the second stage deflection reflecting surface are the scanning beam, the light beams deflected in the first stage deflection reflecting surface are not negatively influenced and as shown in FIG. 7B, when the light beams deflected in the first stage deflection reflecting surface are the scanning beam, the light beams deflected in the second stage deflection reflecting surface are not negatively influenced.

The fθ lens 105a and the fθ lens 105b are arranged at a −X side of the polygon mirror 104 and the fθ lens 105c and the fθ lens 105d are arranged at a +X side of the polygon mirror 104.

The fθ lens 105a and the fθ lens 105b are stacked in a Z-axis direction, the fθ lens 105a is opposite to the first stage deflection reflecting surface, and the fθ lens 105b is opposite to the second stage deflection reflecting surface. Also, the fθ lens 105c and the fθ lens 105d are stacked in the Z-axis direction, the fθ lens 105c is opposite to the second stage deflection reflecting surface, and the fθ lens 105d is opposite to the first stage deflection reflecting surface.

The black light deflected in the polygon mirror 104 is incident on the fθ lens 105a, the yellow light incident on the fθ lens 105d, the cyan light incident on the fθ lens 105b, and the magenta light incident on the fθ lens 105c.

Each fθ lens has a non-arc shape having power, such as moving the light spots to the main scanning direction at constant velocity on the corresponding photoconductor drum according to the rotation of the polygon mirror 104.

The black light transmitting the fθ lens 105a is imaged on the photoconductor drum 30c in a spot shape through the folding mirror 106a, the troidal lens 107a, and the folding mirror 108a (see FIG. 8).

The cyan light transmitting the fθ lens 105b is imaged on the photoconductor drum 30b in the spot shape through the folding mirror 106b, the troidal lens 107b, and the folding mirror 108b (see FIG. 8).

The magenta light transmitting the fθ lens 105c is imaged on the photoconductor drum 30c in the spot shape through the folding mirror 106c, the troidal lens 107c, and the folding mirror 108c (see FIG. 8).

The yellow light transmitting the fθ lens 105d is imaged on the photoconductor drum 30d in the spot shape through the folding mirror 106d, the troidal lens 107d, and the folding mirror 108d (see FIG. 8).

Each folding mirror is arranged so that each optical path length reaching each photoconductor drum from the polygon mirror 104 conforms to one another and all incident positions and incident angles of light in each photoconductor drum are equal to one another.

Figure 9:
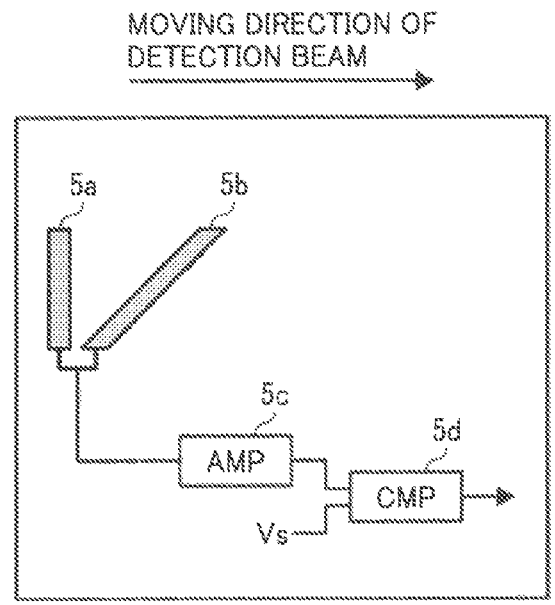
FIG. 9 is a view illustrating an inner configuration example of a light detecting sensor.

As shown in FIG. 9, each light detecting sensor includes a light-receiving device having a first light-receiving unit 5a and a second light-receiving unit 5b, which in the light-receiving surface, have different intervals from each other in the main scanning direction depending on the position of the direction orthogonal to the main scanning direction, an amplifier (AMP) 5c that amplifies a signal (a photoelectric conversion signal) according to received light intensity from the light-receiving device, and a comparator (CMP) that compares an output signal level from the amplifier 5c with a preset reference level Vs to output the comparison results. The output signal from the comparator 5d is supplied to the main controller 210. The amplifier 5c inverts the input signal. The larger the received light intensity of the light-receiving device, the lower the level of the output signal from the amplifier 5c becomes.

The light detecting sensors are used to detect the positional deviations (hereinafter, referred to as sub-scanning deviations for convenience) with respect to the sub-scanning direction of the light spots in the corresponding photoconductor drum. When detecting the sub-scanning deviation, a plurality of light beams (hereinafter, referred to as detection beam for convenience) from a plurality of light emitters (hereinafter, referred to as light emitter for detection for convenience) selected from among thirty two light emitters constituting a laser array is incident on each light detecting unit while moving in the Y-axis direction.

The reference level Vs is set to a level slightly higher than the output signal level from the amplifier 5c when the light-receiving device receives all the detection beam. When the light-receiving device receives all the detection beams, the judgment results in the comparator 5d are varied so that the output signal from the comparator 5d is varied accordingly.

Figure 10:
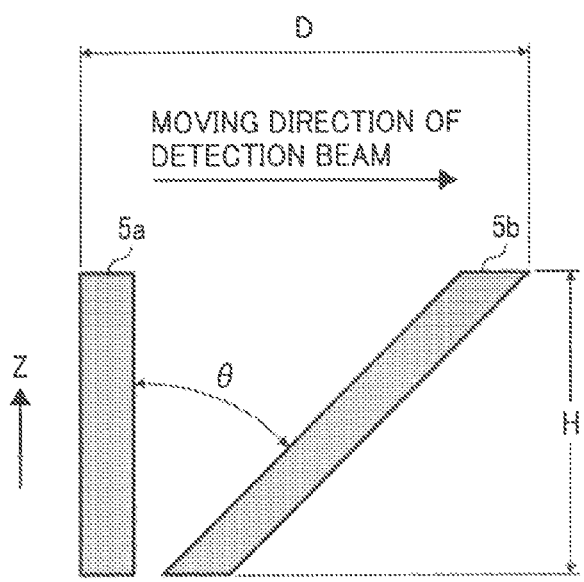
FIG. 10 is a view illustrating a light-receiving device of the light detecting sensor.

As shown in FIG. 10 as one example, the first light-receiving unit 5a is a light-receiving unit in a rectangular shape and its length direction is arranged to be orthogonal to the moving direction of the detection beam within the light-receiving surface. The second light-receiving unit 5b is a light-receiving unit in a rectangular shape and its length direction is arranged at the moving direction side of the detection beam within the first light-receiving unit 5a. The length direction of the second light-receiving unit 5b is inclined by an angle θ (0<θ<90°) with respect to the length direction of the first light-receiving unit 5a within the light-receiving surface.

Figure 11A:
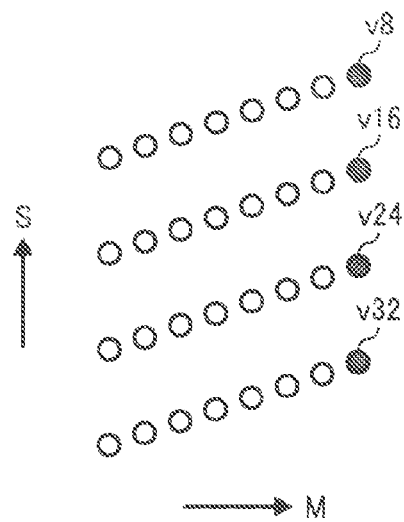
FIG. 11A is a view illustrating a light emitter for detection.
Figure 11B:
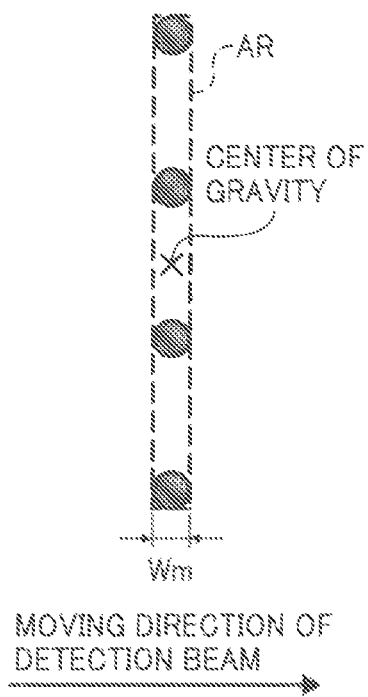
FIG. 11B is a view illustrating light spots of detection beam in light-receiving surfaces.
Figure 12:
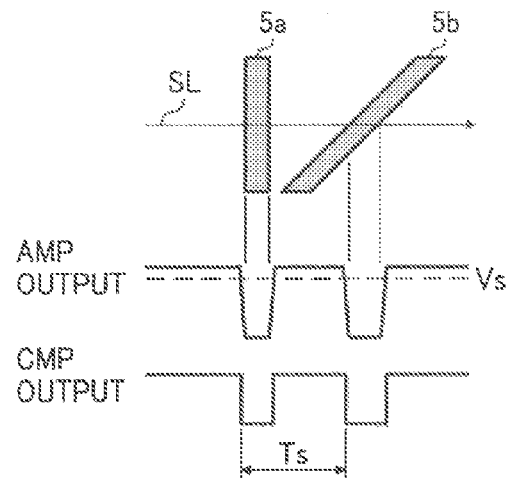
FIG. 12 is a view illustrating an output signal (1) from the light detecting sensor.

As shown in FIG. 11A, the light emitter for detection is the selected four light emitters v8, v16, v24, and v32 parallely arranged in a line along the S direction. The intervals of the two adjacent light emitters are the same in each light emitter. In this case, FIG. 6B is a view showing the light spots of the detection beam in the light-receiving surface. A reference symbol AR in FIG. 6B represents a virtual area in a quadrangular shape surrounding the light spots of the detection beam in the light-receiving surface. If the detection beam is incident on the light detecting sensor while moving in the main scanning direction, as shown in FIG. 12 as one example, when the detection beam is received in the first light-receiving unit 5a and the second light-receiving unit 5b, the output signal from the comparator 5d is varied.

For example, if a difference ΔTs with a reference value of Ts from a rising time to a falling time in the output signal from the comparator 5d, a relation of the following equation is established between ΔTs and sub-scanning deviation Δh. V is a moving speed of the detection beam.

$$\Delta h = (v \times \Delta Ts)/\tan\theta$$

The size of each light-receiving unit is a size capable of covering the overall virtual area (an area AR of FIG. 11B) in the quadrangle shape surrounding the light spots of the detection beam in the light-receiving surface of the light detecting sensor. However, when they are too large as compared to the virtual area, it becomes difficult to ensure uniformity of sensitivity quality in the overall surface of the light-receiving device, yield is reduced, and cost is increased.

The proper angle θ is 30° to 60°. If the angle θ is smaller, the detection sensitivity is reduced. On the other hand, if the angle θ exceeds 60°, problems occurs in which a length H in the direction orthogonal to the main scanning direction with respect to the length D in the main scanning direction of the light-receiving surface is small, a length D for securing the necessary length H is large, the light-receiving surface of the light detecting sensor enters into an image area, or a valid area of the scanning optical system should be set large to make the scanning lens large. When the length H is set to 1 to 3 mm and the length D is set to be equal to or less than 5 mm, the problems do not occurs. The optimal angle is 45°.

Figure 13:
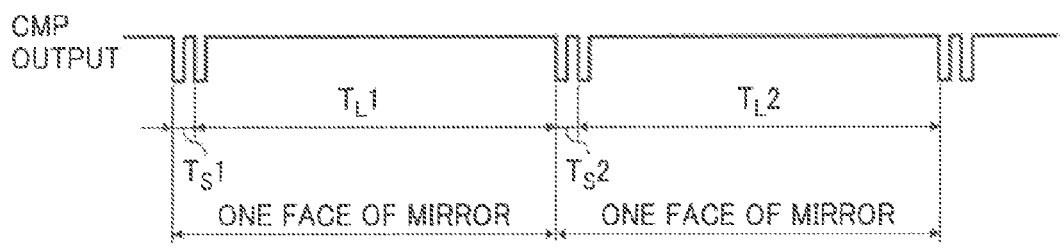
FIG. 13 is a view illustrating an output signal (2) from the light detecting sensor.

FIG. 13 is a view showing a portion of the output signal from the comparator 5d when the polygon mirror 104 is continuously rotating. As the time from the rising to falling in the output signal from the comparator 5d, there are time Ts from the first light-receiving unit 5a to the second light-receiving unit 5b and time $T_L$ from the second light-receiving unit 5b to the first light-receiving unit 5a. The ratio of Ts to $T_L$ is determined by a scanning width and a rotation numbers (scanning speed) of the polygon mirror 104, or the like, usually, Ts:TL=1:200 to 400.

Figure 14:
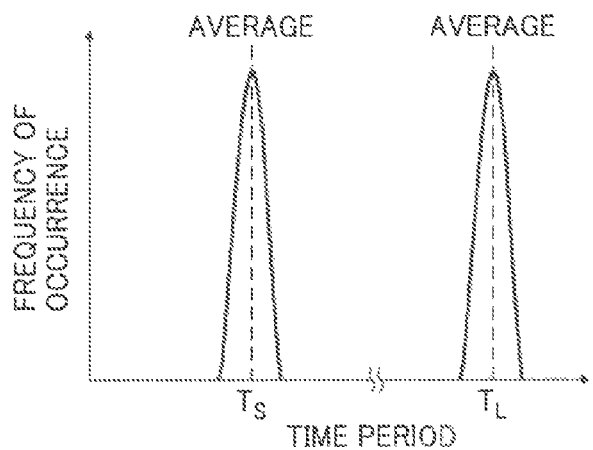
FIG. 14 is a view illustrating a falling time period in the output signals from the light detecting sensor as a histogram.

FIG. 14 is a view showing the plurality of times observed as a histogram. A main controller 210 sequentially stores time measuring data in a memory (not shown) to reduce an influence of fluctuation in time due to the polygon mirror 104 and divides them into two groups so that the Δh is obtained using an average of the data with the short time. A method that divides the data with the short time calculates intermediate time between Ts and $T_L$ and filters it since there is a large difference between the two groups.

Since the polygon mirror is different in surface inclination, damage, dent or flatness (a degree not influencing the image) for each deflection reflecting surface, the present embodiment uses light beams from the overall deflection reflecting surface, making it possible to improve detection precision.

Although considering the fluctuation component, the more the sample number for time the better, the sample number for time is suitably set to be equal to or less than the frequency scanned within non-image forming time (between print pages) between image forming time (time during which a light emitting control on the light source of the laser scanning apparatus is performed based on the image signal) and image forming time of a next page. Specifically, the sample number is suitably about 100 to 500. The sample number is suitably even times of the surface number of the polygon mirror. This means that the sample number as many as one surface of the polygon mirror is 2 (Ts and $T_L$) and the surface inclination, jitter has a cycle as many as one rotation (an overall cycle) of the polygon mirror.

The black light after the end of scanning, which transmits the troidal lens 107a, is incident on the light detecting sensor 205a, the light detecting sensor being arranged at a position equivalent to an imaging plane. It is possible to detect the sub-scanning deviation in the photoconductor drum 30a by the output signal from the light detecting sensor 205a.

The cyan light after the end of scanning, which transmits the troidal lens 107b, is incident on the light detecting sensor 205b, the light detecting sensor being arranged at a position equivalent to an imaging plane. It is possible to detect the sub-scanning deviation in the photoconductor drum 30b by the output signal from the light detecting sensor 205b.

The magenta light after the end of scanning, which transmits the troidal lens 107c, is incident on the light detecting sensor 205c, the light detecting sensor being arranged at a position equivalent to an imaging plane. It is possible to detect the sub-scanning deviation in the photoconductor drum 30c by the output signal from the light detecting sensor 205c.

The yellow light after the end of scanning, which transmits the troidal lens 107d, is incident on the light detecting sensor 205d, the light detecting sensor being arranged at a position equivalent to an imaging plane. It is possible to detect the sub-scanning deviation in the photoconductor drum 30d by the output signal from the light detecting sensor 205d.

The main controller 210 applies voltage corresponding to the sub-scanning deviation in the photoconductor drum 30a to the liquid crystal deflecting device 203a to correct the deviation, applies voltage corresponding to the sub-scanning deviation in the photoconductor drum 30b to the liquid crystal deflecting device 203b to correct the deviation, applies voltage corresponding to the sub-scanning deviation in the photoconductor drum 30c to the liquid crystal deflecting device 203c to correct the deviation, and applies voltage corresponding to the sub-scanning deviation in the photoconductor drum 30d to the liquid crystal deflecting device 203d to correct the deviation.

As can be appreciated from the explanation, in the laser scanning apparatus 100 according to the present embodiment, the deflector is configured of the polygon mirror 104, the scanning optical system is configured of the four fθ lenses 105a, 105b, 105c, and 105d, the eight folding mirrors 106a, 106b, 106c, 106d, 108a, 108b, 108c, and 108d, and the four troidal lenses 107a, 107b, 107c, and 107d, and the photo detector is configured of the four light detecting sensors 205a, 205b, 205c, and 205d.

A position correcting apparatus is configured of the main controller 210.

As described above, the laser scanning apparatus 100 according to the present embodiment includes the two light source units 200a and 200b that have the plurality of light emitters, the polygon mirror 104 that deflects light beams from each light source unit, the scanning optical system that condenses light deflected in the polygon mirror 104 in each photoconductor drum, and the four light detecting sensors 205a, 205b, 205c, and 205d installed corresponding to each photoconductor drum. Each photo detector to which the plurality of light beams passing through the scanning optical system are incident while moving in the main scanning direction includes at least one light-receiving device having the first light-receiving unit 5a and the second light-receiving unit 5b, which in the light-receiving surfaces, have the different intervals from each other in the main scanning direction depending on the position of the direction orthogonal to the main scanning direction. All the sizes of the first and the second light-receiving units are sizes capable of covering the overall virtual area in the quadrangular shape surrounding the plurality of light spots in the light-receiving surfaces. Accordingly, each light-receiving unit is capable of assuring sufficient light intensity and the light detecting sensor is capable of outputting the signals with excellent S/N ratio. As a result, it is possible to accurately detect the positional deviation with respect to the sub-scanning direction of the light spots formed on the surfaces of each photoconductor drum without increasing costs.

The main controller 210 applies voltage corresponding to the sub-scanning deviations in each photoconductor drum to the corresponding liquid crystal deflecting devices to correct the deviations. As a result, it is possible to prevent color deviation.

The printer 10 according to the present embodiment includes the laser scanning apparatus 100 that is capable of accurately detecting the positional deviation with respect to the sub-scanning direction of the light spots formed on the surfaces of each photoconductor drum without increasing costs, making it possible to form the high-quality image at high speed without increasing costs.

Although the present embodiment explains the light emitters for detection using the four light emitters parallely arranged in a line along the S direction; however, it is not limited thereto.

Figure 15A:
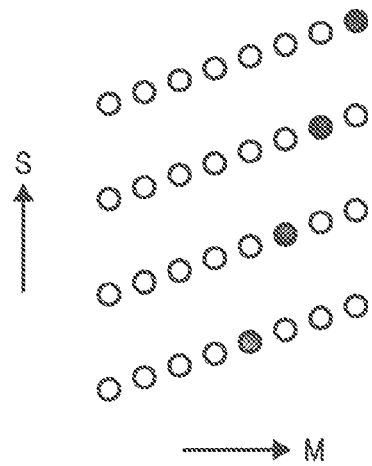
FIG. 15A is a view illustrating a first modification of the light emitter for detection.
Figure 15B:
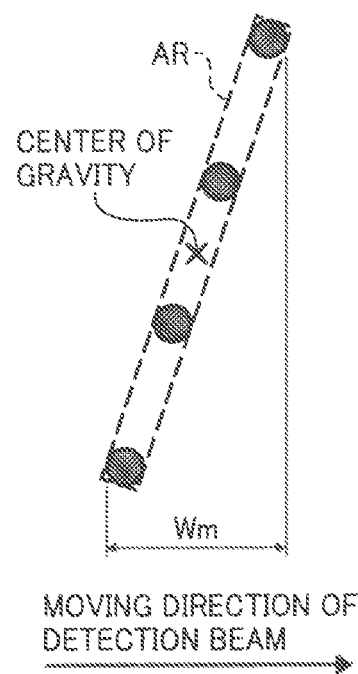
FIG. 15B is a view illustrating the light spots of the detection beam in the light-receiving surfaces at that time.
Figure 16A:
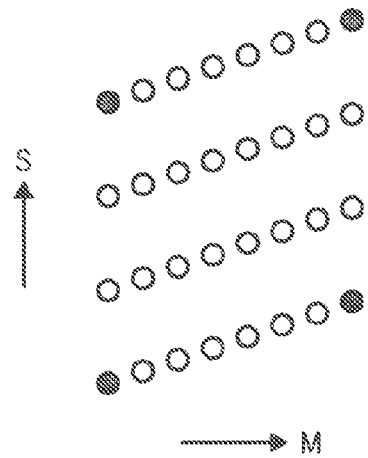
FIG. 16A is a view illustrating a second modification of the light emitter for detection.
Figure 16B:
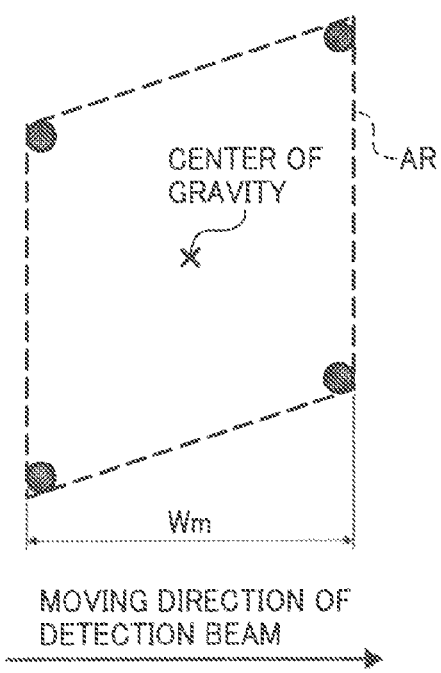
FIG. 16B is a view illustrating the light spots of the detection beam in the light-receiving surfaces at that time.
Figure 17:
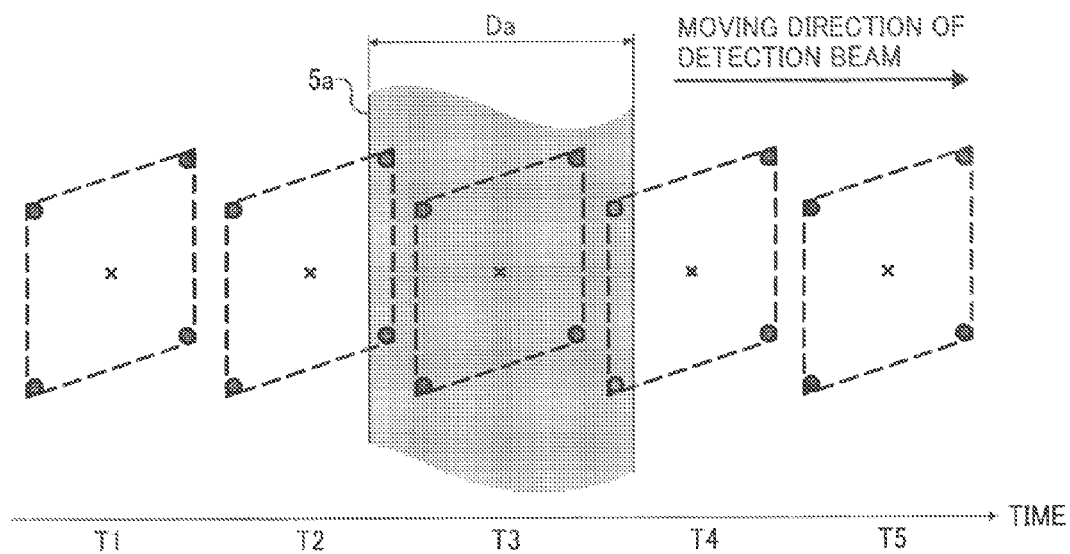
FIG. 17 is a view illustrating a first light-receiving unit corresponding to the light emitter for detection of FIG. 16A.
Figure 18:
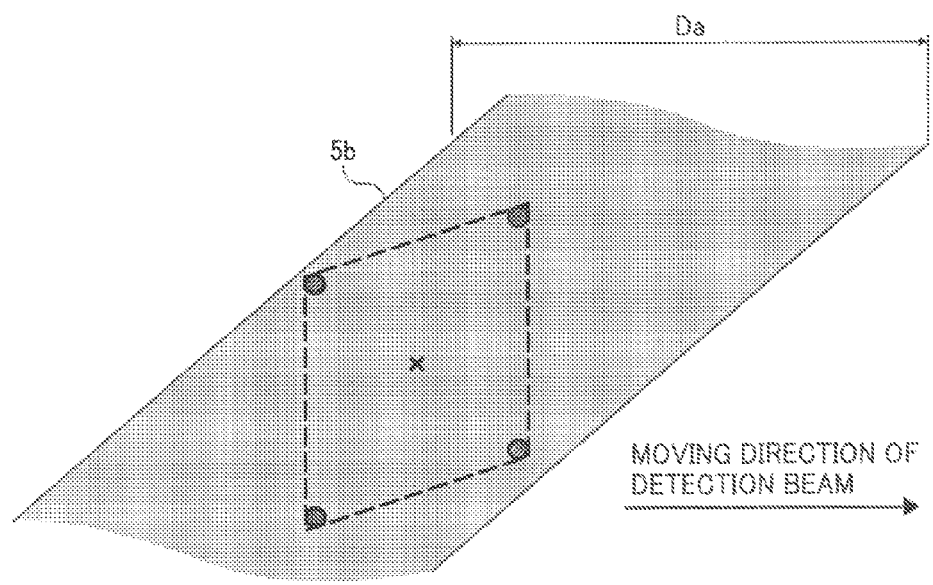
FIG. 18 is a view illustrating a second light-receiving unit corresponding to the light emitter for detection of FIG. 16A.

For example, in FIG. 15A, the interval of the two adjacent light emitters is larger than that of the present embodiment. In this case, FIG. 15B is a view showing the light spots of the detection beam in the light-receiving surface. Also, in FIG. 16A, the interval of the two adjacent light emitters is even larger. In this case, FIG. 16B is a view showing the light spots of the detection beam in the light-receiving surface. As a result, it is possible to suppress the lifetime degradation of the light emitter due to temperature rise. However, each light-receiving unit should have the size that is capable of including the overall virtual area AR in the quadrangular shape surrounding the plurality of light spots of the detection beam in the light-receiving surface of the photo detector in an case (see FIGS. 17 and 18).

Figure 19:
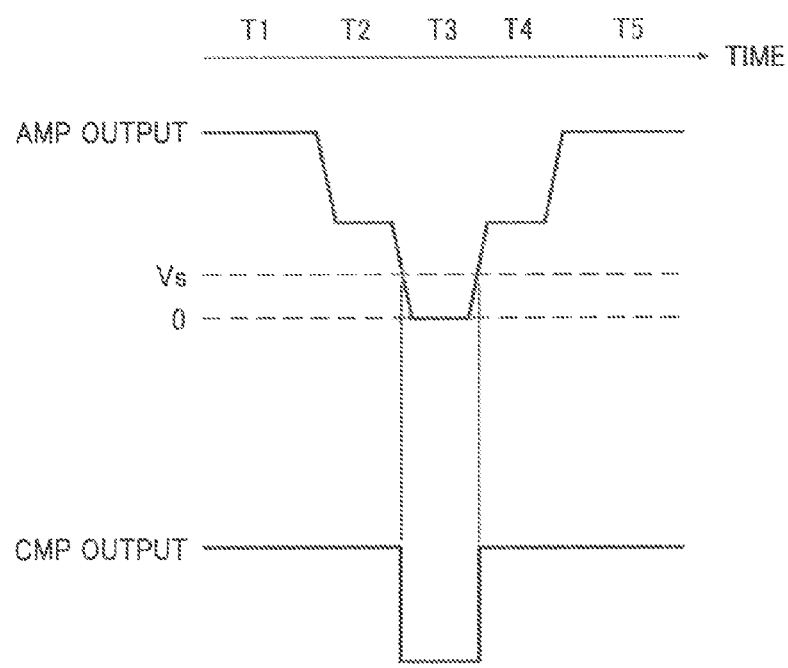
FIG. 19 is a view illustrating the output signals from the light detecting sensor in FIG. 17.

For example, FIG. 19 is a view showing, when using the four light emitters v1, v8, v25, and v32 positioned at four corners as the light emitters for detection, the output signal from the amplifier 5c, the reference level Vs, and the output signal from the comparator 5d when the light spots of the detection beam passes through the first light-receiving unit 5a. In this case, the reference level Vs is set to a level between the output signal level from the amplifier 5c when the light-receiving device receives the four light spots and the output signal level from the amplifier 5c when the light-receiving device receives the three light spots.

Figure 20A:
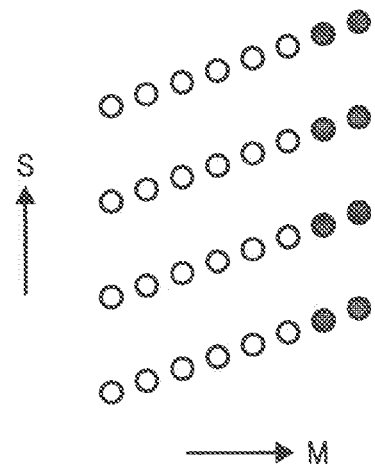
FIG. 20A is a view illustrating a third modification of the light emitter for detection.
Figure 20B:
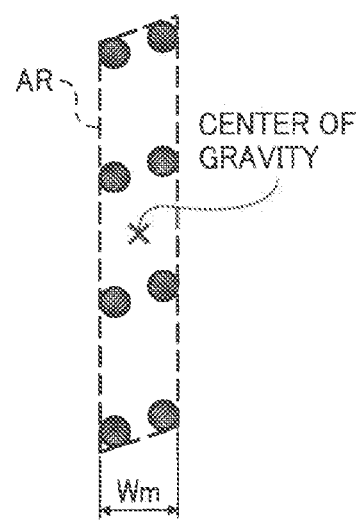
FIG. 20B is a view illustrating the light spots of the detection beam in the light-receiving surfaces at that time.

When the emitted light intensity from the light emitter is small, more light emitters are allowed to use the light emitters for detection. FIG. 20A is, for example, a view showing the eight light emitters used as the light emitters for detection. In this case, FIG. 20B is a view showing the light spots of the detection beam in the light-receiving surface.

Figure 21A:
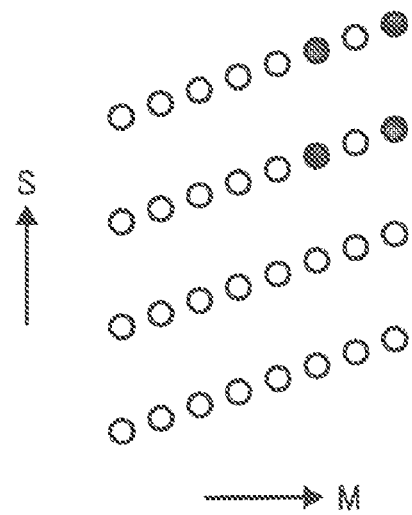
FIG. 21A is a view illustrating a fourth modification of the light emitter for detection.
Figure 21B:
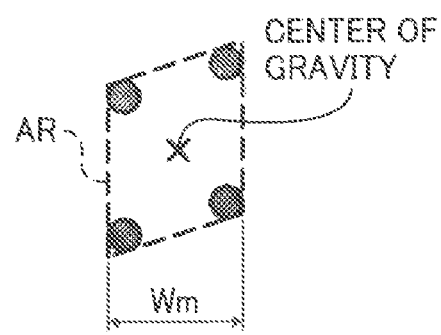
FIG. 21B is a view illustrating the light spots of the detection beam in the light-receiving surfaces at that time.

The light emitters for detection may be selected such that the size of the virtual area AR becomes small. (see FIGS. 21A and 21B). As a result, it is possible to make the light-receiving device small and low cost.

As shown in FIG. 22 as one example, a variation in a waveform of the output signal from the amplifier 5c may be caused due to a reduction in reflectance or transmittance of the optical device (aging deterioration) and a reduction of the rotation numbers of the polygon mirror due to a change in writing density (the polygon mirror rotates at the rotation numbers reduced by 50% due to a change from 1200 dpi to 600 dpi). In this case, the deviation of the falling timing in the output signal from the comparator 5d is caused so that the erroneous sub-scanning deviation is detected. Therefore, the falling timing is correlated with integrated amount (integrated light intensity) of the light intensity incident on the light-receiving device and is controlled so that the integrated light intensity is constant, making it possible to remove the deviation.

Although it is optimal that the integrated light intensity is corrected and controlled to maintain an initial value (when shipped from a factory) set in a process of manufacturing (assembling) the laser scanning apparatus, it may be controlled within ±10% of the initial value as a range that does not cause any problems in the detection precision in practical use. In other words, it is exemplarily controlled within a preset range.

Specifically, the output signal from the light-receiving device is input to a differential circuit so that the output level of the differential circuit is constant. For example, when the writing of the black image is ended and the light detecting sensor 205a performs the light detection (Lk1 in FIG. 6), the output from the differential circuit is monitored and a driving signal from the light emitter is controlled to make the light-receiving amount per unit time constant just before a subsequent light detecting sensor 205a performs the light detection (Lk2 in FIG. 6) using the monitored results. The main controller 210 may perform the control by having the differential circuit.

In the present embodiment, as shown in FIG. 23 as one example, each light detecting sensor may include a first light-receiving device having the first light-receiving unit 5a1 and the second light-receiving unit 5b1, which in the light-receiving surfaces, have the different intervals from each other in the main scanning direction depending on the position of the direction orthogonal to the main scanning direction, a second light-receiving device having the first light-receiving unit 5a2 and the second light-receiving unit 5b2, which in the light-receiving surfaces, have the different intervals from each other in the main scanning direction depending on the position of the direction orthogonal to the main scanning direction, a first amplifier (AMP1) 5c1 that amplifies the signal (a photoelectric conversion signal) according to the received light intensity from the first light-receiving device, a second amplifier (AMP2) 5c2 that amplifies the signal (a photoelectric conversion signal) according to the received light intensity from the second light-receiving device, and a comparator 5d that compares an output signal level from the first amplifier 5c1 with an output signal level from the amplifier 5c2 to output the comparison results. The reference level Vs is not needed.

In this case, the first light-receiving unit 5a2 is arranged at the moving direction side of the detection beam of the first light-receiving unit 5a1 and the second light-receiving unit 5b2 is arranged at the moving direction side of the detection beam of the second light-receiving unit 5b1. FIG. 24 is a view showing the output signal from each amplifier and the output signal from the comparator 5d as one example when using the light beams from the four light emitters parallely arranged in a line along the S direction as the detection beam. Even in the case, the main controller 210 is capable of obtaining the sub-scanning deviation.

The embodiment explains each laser array including the thirty two light emitters, but each layer array is allowed to have any number of a plurality of light emitters, without being limited thereto. The plurality of light emitters may be arranged one-dimensionally.

In the embodiment, the light source unit for every color is allowed to be installed. In other words, the four light source units is allowed to be installed.

The embodiment explains the color printer of a tandem type as the image forming apparatus, but is not limited thereto. For example, even in the image forming apparatus (a duplicator, a facsimile, a multifunction product having the functions) other than the printer, if the image forming apparatus includes the laser scanning apparatus 100, it is capable of forming high-quality image at high speed without increasing costs.

The image forming apparatus is allowed to use a coloring medium (positive photographic paper), which is colored by heat energy of beam spots, as an image carrier. In this case, a visible image can be directly formed on the image carrier by the light scanning.

The embodiment explains the multicolor printer as the image forming apparatus, but is not limited thereto. Even in the monochromatic image forming apparatus, it is capable of forming high-quality image at high speed without increasing costs by including the laser scanning apparatus having the light detecting sensor.

As described above, the laser scanning apparatus of the present invention is capable of accurately detecting the positional deviation with respect to the sub-scanning direction of the light spots formed on the surface to be scanned without increasing costs. Also, the image forming apparatus of the present invention is capable of forming high-quality image at high speed without increasing costs.

Hereinafter, a second embodiment of the present invention will be explained.

FIG. 25 is a schematic view showing a printer 1000 as the image forming apparatus according to the second embodiment of the present invention.

The printer 1000 includes a laser scanning apparatus 1010, a photoconductor drum 1030, a electrifying charger 1031, a developing roller 1032, a transfer charger 1033, a charge eliminating unit 1034, a cleaning blade 1035, a toner cartridge 1036, a paper feeding roller 1037, a paper feeding tray 1038, a resist roller pair 1039, a fixing roller 1041, a paper exiting roller 1042, a paper exiting tray 1043, a communication controller 1050, and a printer controller 1060 that collectively controls each units.

The communication controller 1050 controls two-way communication with external devices via a network and the like.

A photosensitive layer is formed on a surface of the photoconductor drum 1030. In other words, the surface of the photoconductor drum 1030 is a surface to be scanned. The photoconductor drum 1030 is configured to rotate in an arrow direction in FIG. 25.

The electrifying charger 1031, the developing roller 1032, the transfer charger 1033, the charge eliminating unit 1034, and the cleaning blade 1035 are each arranged near the surface of the photoconductor drum 1030. The electrifying charger 1031, the developing roller 1032, the transfer charger 1033, the charge eliminating unit 1034, and the cleaning blade 1035 are arranged in this order along a rotating direction of the photoconductor drum 1030.

The electrifying charger 1031 uniformly charges the surfaces of the photoconductor drum 1030.

The laser scanning apparatus 1010 irradiates the surface of the photoconductor drums 1030 charged by the electrifying charger 1031, with beams modulated based on image information from a higher-level device (for example, a personal computer). As a result, in the surface of the photoconductor drum 1030, latent images corresponding to the image information are formed on the surface of the photoconductor drum 1030. The formed latent images move in a direction of the developing roller 1032 according to the rotation of the photoconductor drum 1030. A configuration of the laser scanning apparatus 1010 will be explained below.

The toner cartridge 1036 receives a toner and supplies it to the developing roller 1032.

The developing roller 1032 attaches the toner supplied from the toner cartridge 1036 to the latent images formed on the surface of the photoconductor drum 1030 and develops the image. The image to which the toner is attached (hereinafter, refer to as a toner image) moves in a direction of the transfer charger 1033 according to the rotation of the photoconductor drum 1030.

The paper feeding tray 1038 receives recording papers 1040. The paper feeding roller 1037 is disposed near the paper feeding tray 1038 and the paper feeding roller 1037 takes out the recording papers 1040 by one sheet from the paper feeding tray 1038 and conveys it to the resist roller pair 1039. The resist roller pair 1039 once holds the recording papers 1040 taken out by the paper feeding roller 1037 and sends out the recording papers 1040 toward a gap between the photoconductor drum 1030 and the transfer charger 1033 with the rotation of the photoconductor drum 1030.

The transfer charger 1033 is applied with reverse polarity voltage to the toner to electrically attract the toner on the surface of the photoconductor drum 1030 to the recording papers 1040. The toner image on the surface of the photoconductor drum 1030 is transferred to the recording papers 104 by the voltage. The recording papers 1040 with the transferred image are sent to the fixing roller 1041.

The fixing roller 1041 applies heat and pressure to the recording papers 1040 so that the toner is fixed to the recording papers 1040. The recording papers 1040 with the fixed toner are sent to the paper exiting tray 1043 through the paper exiting roller 1042 so that they are sequentially stacked on the paper exiting tray 1043.

The charge eliminating unit 1034 eliminates charges on the surface of the photoconductor drum 1030.

The cleaning blade 1035 removes the toner (a residual toner) remained on the surface of the photoconductor drum 1030. The residual toner removed is used again. The surface of the photoconductor drum 1030 where the residual toner is removed returns to the position of the electrifying charger 1031 again.

Hereinafter, a configuration of the laser scanning apparatus 1010 will be described.

Figure 26:
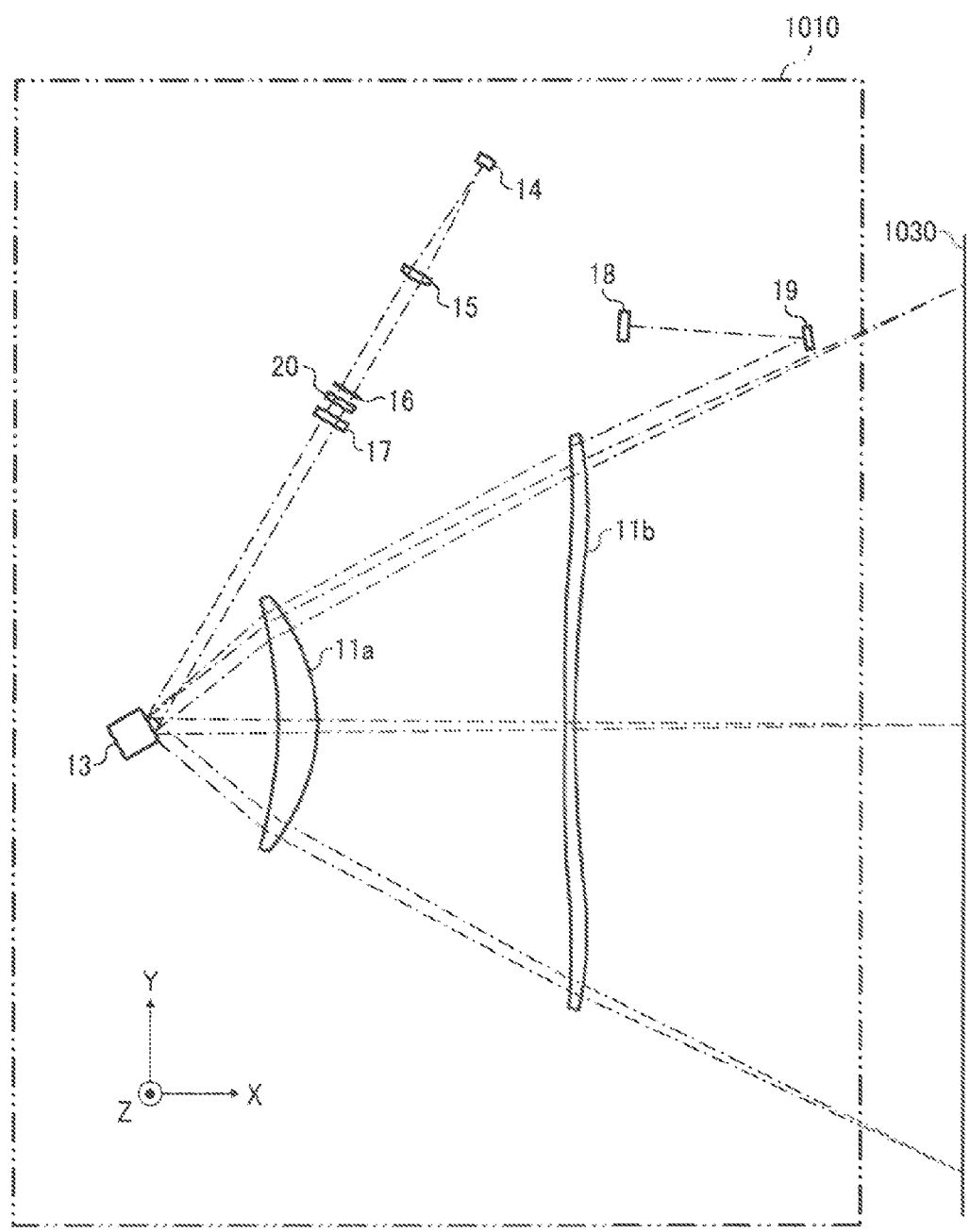
FIG. 26 is a view illustrating a schematic configuration of the laser scanning apparatus in FIG. 25.

As shown in FIG. 26, the laser scanning apparatus 1010 includes a light source 14, a coupling lens 15, an opening plate 16, a cylindrical lens 17, a polygon mirror 13, a deflector-side scanning lens 11a, an imaging plane-side scanning lens 11b, a synchronization detecting sensor 18, a mirror for synchronization detection 19, a liquid crystal deflecting device 20, and a scanning controller (not shown), etc. The present specification will explain a length direction of the photoconductor drum 1030 as a Y-axis direction and two directions orthogonal to each other within a plane vertical to the Y-axis direction as a Z-axis direction and an X-axis direction.

The light source 14 has a two-dimensional array (referred to as a two-dimensional array 100) wherein forty light emitters are formed, for example, on one substrate.

Figure 27A:
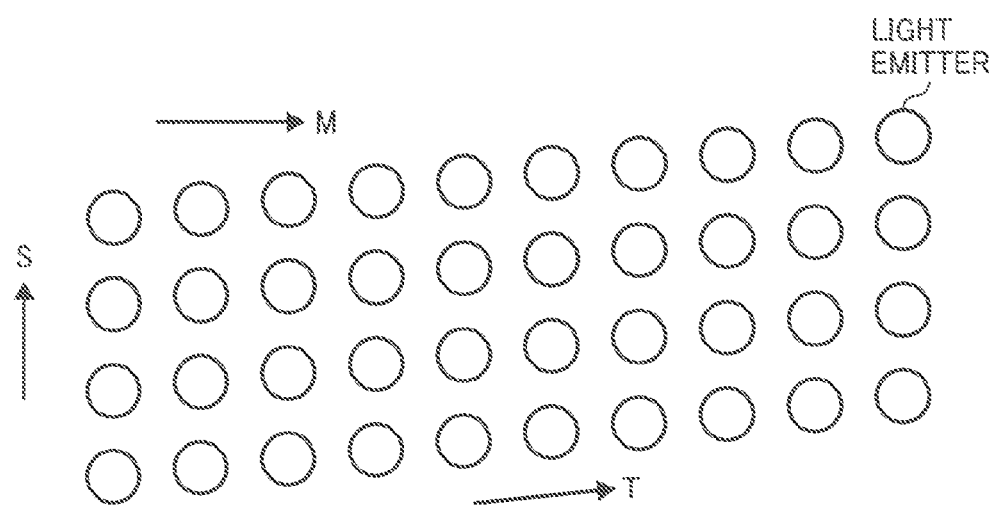
FIGS. 27A and 27B are both views illustrating a two-dimensional array of a VCSEL included in a light source in FIG. 26.

As shown in FIG. 27A as one example, the two-dimensional array 100 has four arrays of light emitters where ten light emitters are equidistantly arranged along a direction (hereinafter, referred to as a T direction for convenience) with an inclined angle α L from a direction (hereinafter, referred to as a M direction for convenience) corresponding to the main scanning direction toward a direction (hereinafter, referred to as an S direction for convenience) corresponding to the sub-scanning direction. The four arrays of light emitters are equidistantly arranged in the S direction. In other words, the forty light emitters are two-dimensionally arranged along the T direction and the S direction, respectively. Here, arrays are called an array of a first light emitter, an array of a second light emitter, an array of a third light emitter, an array of a fourth light emitter from the top one toward the bottom one in FIG. 27 for convenience. Also, in the present specification, an interval of the light emitters is a distance between the centers of two light emitters.

Figure 27B:
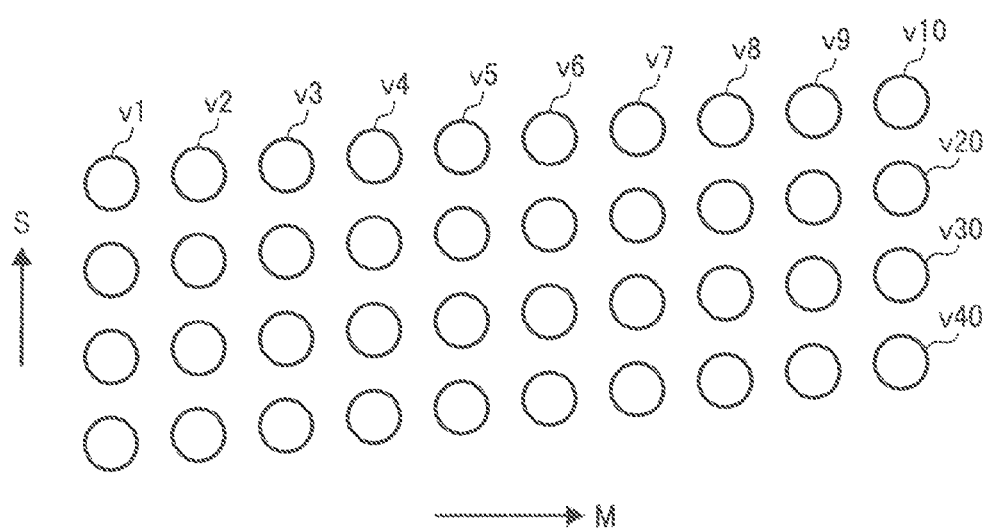

To specify each light emitter, as shown in FIG. 27B for convenience, ten light emitters constituting the array of the first light emitter called v1 to v10, ten light emitters constituting the array of the second light emitter v11 to v20, ten light emitters constituting the array of the third light emitter v21 to v30, and ten light emitters constituting the array of the fourth light emitter v31 to v40, from lower left toward upper right in FIG. 27B.

Each light emitter is a vertical cavity surface emitting laser (VCSEL) with a 780 nm band Returning to FIG. 26, the coupling lens 15 makes beams emitted from the light source 14 almost parallel light beams.

The opening plate 16 has the openings and defines a diameter of beam through the coupling lens 15.

The liquid crystal deflection device 20 is arranged on the optical path of the beam passing through the openings of the opening plate 16, making it possible to deflect incident beam to the sub-scanning direction according to applied voltage.

The cylindrical lens 17 images the beam through the liquid crystal deflection device 20 to the sub-scanning direction near the deflection reflecting surface of the polygon mirror 13.

The optical system arranged on the optical path between the light source 14 and the polygon mirror 13 is referred to as a pre-deflector optical system. In the present embodiment, the pre-deflector optical system includes the coupling lens 15, the opening plate 16, the liquid crystal deflection device 20, and the cylindrical lens 17.

The polygon mirror has four mirrors, each mirror being the deflection reflecting surface. The polygon mirror 13 rotates around an axis parallel to the Z-axis direction at constant velocity to deflect the beam from the cylindrical lens 17.

The deflector-side scanning lens 11a is arranged on the optical path of the beam deflected in the polygon mirror 13.

The imaging plane-side scanning lens 11b is arranged on the optical path of the beam through the deflector-side scanning lens 11a. The beam through the imaging plane-side scanning lens 11b irradiates the surface of the photoconductor drum 1030 to form light spots. The light spots moves in a length direction of the photoconductor drum 1030 according to the rotation of the polygon mirror 13. In other words, they are scanned on the photoconductor drum 1030. At this time, the moving direction of the light spots is a main scanning direction.

Each surface (an incident surface, an emitting surface) of the deflector-side scanning lens 11a and the imaging plane-side scanning lens 11b is an aspherical surface represented by the following equations (1) and (2). X is a coordinate of an X-axis direction and Y is a coordinate of a Y-axis direction. A center of the incident surface is Y=0. Cm0 represents a curvature in the main scanning direction in Y=0 and is an inverse number of a curvature radius Rm. a00, a01, a02, ... are aspherical surface coefficients in a main scanning shape. Cs(Y) is a curvature in the sub-scanning direction with respect to Y, Rso is a curvature radius on the optical axis in the sub-scanning direction, b00, b01, b02, ... are aspherical surface coefficients in a sub-scanning direction. The optical axis is an axis penetrating through a point of the center in the sub-scanning direction in Y=0.

$$X(Y) = \frac{C_{m0} \cdot Y^2}{1 + \sqrt{1 - (1 + a_{00}) \cdot C_{m0}^2 \cdot Y^2}} + \quad (1)$$
$$a_{01} \cdot Y + a_{02} \cdot Y^2 + a_{03} \cdot Y^3 + a_{04} \cdot Y^4 + \ldots$$

$$Cs(Y) = \frac{1}{R_{s0}} + b_{01} \cdot Y + b_{02} \cdot Y^2 + b_{03} \cdot Y^3 \ldots \quad (2)$$

One example of values of Rm, Rs0, and each aspherical surface coefficient in each surface (an incident surface, an emitting surface) of each scanning lens are indicated in the following table 1.

embodiment, the scanning optical system includes the deflector-side scanning lens 11a and the imaging plane-side scanning lens 11b.

Figure 28:
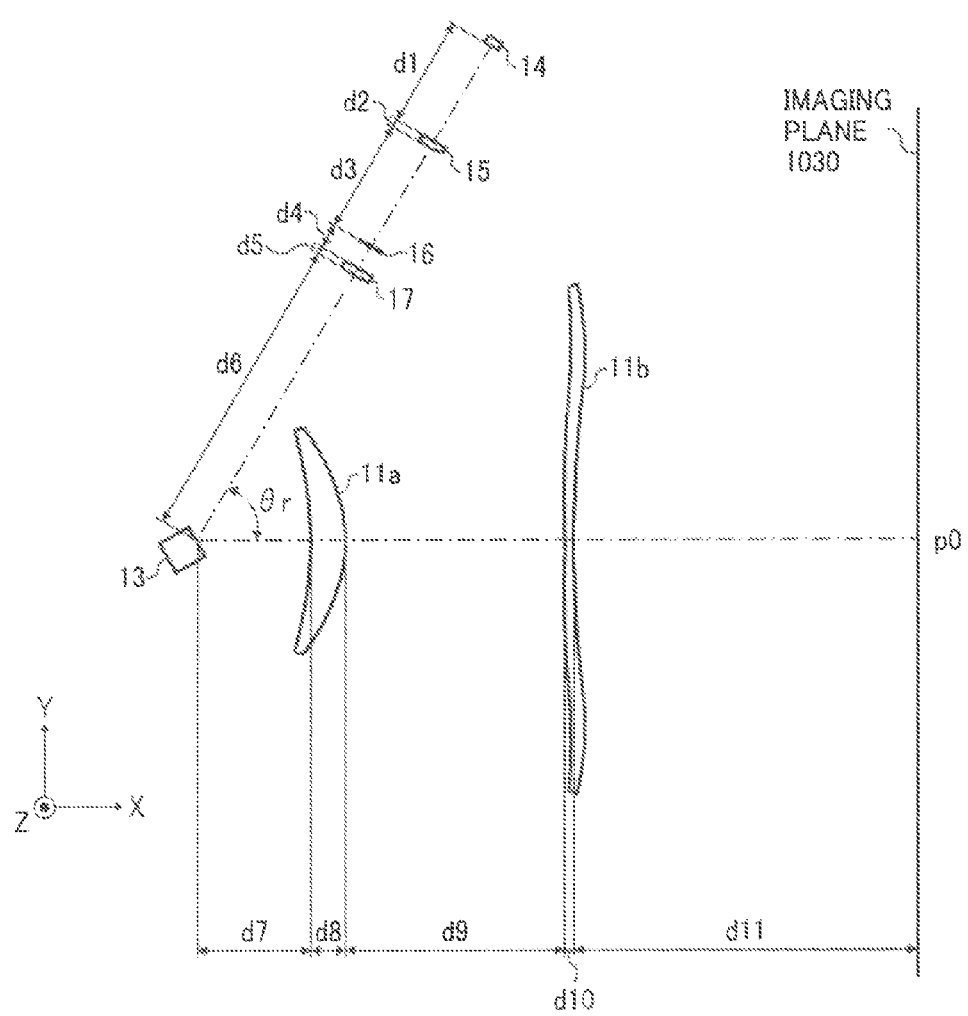
FIG. 28 is a view illustrating a positional relation of a main optical device in the laser scanning apparatus of FIG. 26.

FIG. 28 is a view showing a positional relation of each optical device. In FIG. 28, one example of specific values (mm in unit) of reference symbols d1 to d11 is indicated in the following table 2.

TABLE 2

| d1 | d2 | d3 | d4 | d5 | d6 | d7 | d8 | d9 | d10 | d11 |
|---|---|---|---|---|---|---|---|---|---|---|
| 46.06 | 3.0 | 47.69 | 12.85 | 3.0 | 108.7 | 46.31 | 13.50 | 89.73 | 3.50 | 141.36 |

An angle (θr in FIG. 28) of the incident direction of the beam from the cylindrical lens 17 and the moving direction of the beam reflected toward a position (a position of a reference symbol p0 in FIG. 28) of an image height 0 in the surface of the photoconductor drum 1030 from the deflection reflecting surface of the polygon mirror 13 is 60°.

In the present embodiment, the plurality of beams from the plurality of light emitters selected from among forty light emitters in the two-dimensional array 100 are used for the synchronization detection.

Returning to FIG. 26, the plurality of beams for synchronization detection deflected in the polygon mirror 13 are incident on the synchronization detecting sensor 18 while moving in the main scanning direction through the scanning optical system and the mirror 19 for synchronization detection. The synchronization detecting sensor 18 outputs a signal (a photoelectric conversion signal) according to received light intensity.

Figure 29:
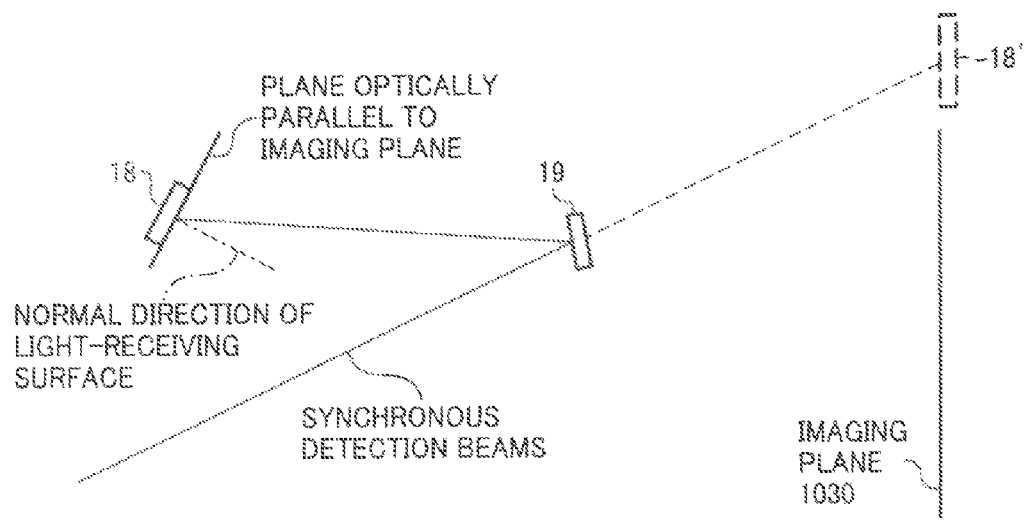
FIG. 29 is a view illustrating a plane optically almost parallel to an imaging plane.

As shown in FIG. 29 as one example, the synchronization detecting sensor 18 is arranged to male the light-receiving surface to be optically almost parallel to the imaging plane. In

TABLE 1

| | Deflector-side scanning lens 11a | | Imaging plane-side scanning lens 11b | |
|---|---|---|---|---|
| | Incident surface | Output surface | Incident surface | Output surface |
| $R_m$ | −120 | −59.279 | −10000 | 540.625 |
| $R_{s0}$ | −500 | −600 | 521.92 | −40.751 |
| $a_{00}$ | 0 | 0 | 0 | 0 |
| $a_{04}$ | $8.88524 \times 10^{-7}$ | $9.22409 \times 10^{-7}$ | $3.28563 \times 10^{-7}$ | $1.27798 \times 10^{-7}$ |
| $a_{06}$ | $-2.62914 \times 10^{-10}$ | $6.77825 \times 10^{-11}$ | $-7.08542 \times 10^{-11}$ | $-4.62873 \times 10^{-11}$ |
| $a_{08}$ | $2.18464 \times 10^{-14}$ | $-4.11244 \times 10^{-14}$ | $6.26922 \times 10^{-15}$ | $4.04921 \times 10^{-15}$ |
| $a_{10}$ | $1.36766 \times 10^{-17}$ | $1.3728 \times 10^{-17}$ | $-2.73157 \times 10^{-19}$ | $-1.65975 \times 10^{-19}$ |
| $a_{12}$ | $-3.13542 \times 10^{-21}$ | $2.06956 \times 10^{-21}$ | $4.73881 \times 10^{-24}$ | $2.58548 \times 10^{-24}$ |
| $b_{01}$ | 0 | $-1.59477 \times 10^{-6}$ | $-7.57567 \times 10^{-7}$ | 0 |
| $b_{02}$ | 0 | $-4.33213 \times 10^{-6}$ | $-1.1328 \times 10^{-6}$ | $2.31146 \times 10^{-7}$ |
| $b_{03}$ | 0 | $4.98199 \times 10^{-9}$ | $2.60617 \times 10^{-10}$ | 0 |
| $b_{04}$ | 0 | $-2.85938 \times 10^{-9}$ | $7.89614 \times 10^{-11}$ | 0 |
| $b_{05}$ | 0 | $-2.67713 \times 10^{-12}$ | $-5.02709 \times 10^{-14}$ | 0 |
| $b_{06}$ | 0 | $2.87783 \times 10^{-13}$ | $1.40512 \times 10^{-14}$ | 0 |
| $b_{07}$ | 0 | $-1.91653 \times 10^{-15}$ | $4.55389 \times 10^{-18}$ | 0 |
| $b_{08}$ | 0 | $2.04238 \times 10^{-15}$ | $-2.01401 \times 10^{-18}$ | 0 |
| $b_{09}$ | 0 | $1.01413 \times 10^{-18}$ | $-1.54602 \times 10^{-22}$ | 0 |
| $b_{10}$ | 0 | $-6.7299 \times 10^{-19}$ | $7.48935 \times 10^{-23}$ | 0 |

The optical system arranged on the optical path between the polygon mirror 13 and the photoconductor drum 1030 is referred to as the scanning optical system. In the present FIG. 29, a reference numeral 18' represents a position of the synchronization detecting sensor 18 assuming that the mirror 19 for synchronization detection is not present.

A normal direction of the light-receiving surface of the synchronization detecting sensor 18 is inclined to the incident direction of the synchronization detection beams (see FIG. 29).

The synchronization detecting sensor 18 is configured as in FIG. 9 as one example. The light-receiving range of the synchronization detecting sensor 18 is determined according to a standard.

The synchronization detecting sensor 18 is used for detecting the scanning start in the photoconductor drum 1030 and the positional deviation (hereinafter, referred to as sub-scanning deviation) with respect to the sub-scanning direction of the light spots formed on the surface of the photoconductor drum 1030.

Figure 30A:
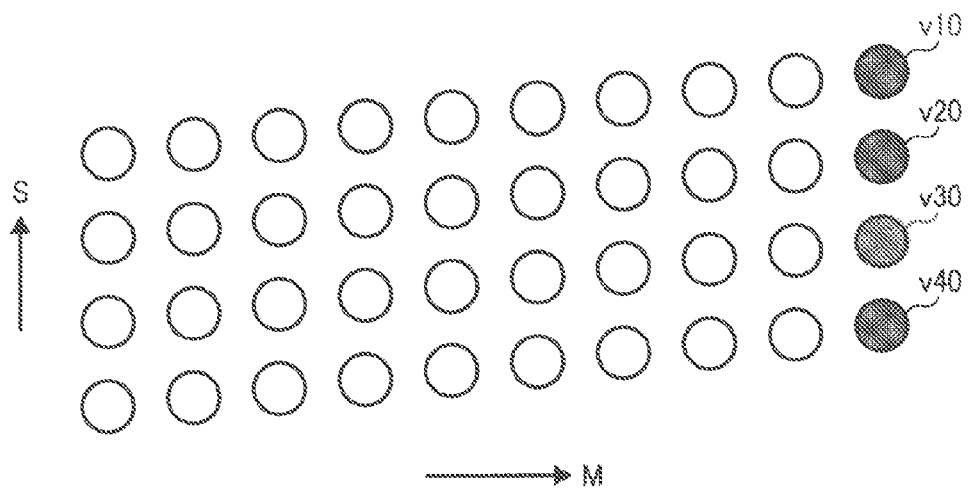
FIG. 30A is a view illustrating a light emitter for detection according to a second embodiment.
Figure 30B:
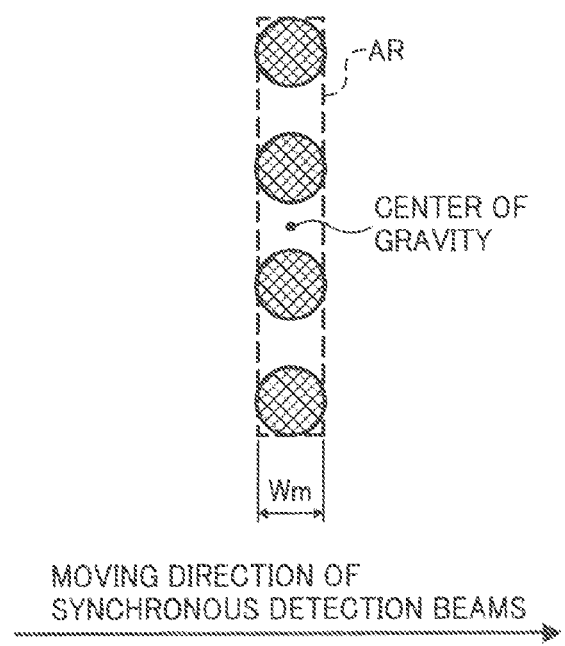
FIG. 30B is a view illustrating the light spots of the plurality of beams for synchronization detection in the light-receiving surfaces.

In the present embodiment, as shown in FIG. 30A, four light emitters v10, v20, v30, and v40 parallely arranged in a line along the S direction are selected as the plurality of light emitters for emitting a plurality of beams for synchronization detection (hereinafter, referred to as a light emitter for detection for convenience). FIG. 30B is a view showing the light spots of the plurality of beams for synchronization detection in the light-receiving surface of the synchronization detecting sensor 18.

Figure 31A:
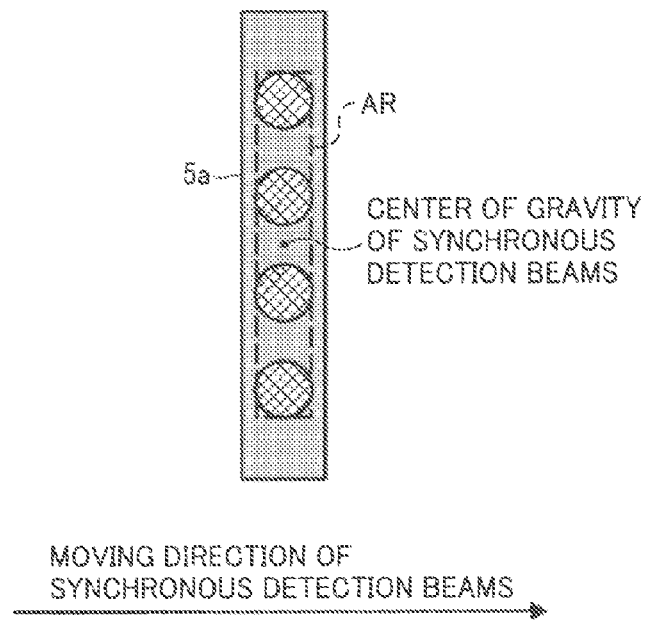
FIG. 31A is a view illustrating a first light-receiving unit of a synchronization detecting sensor.
Figure 31B:
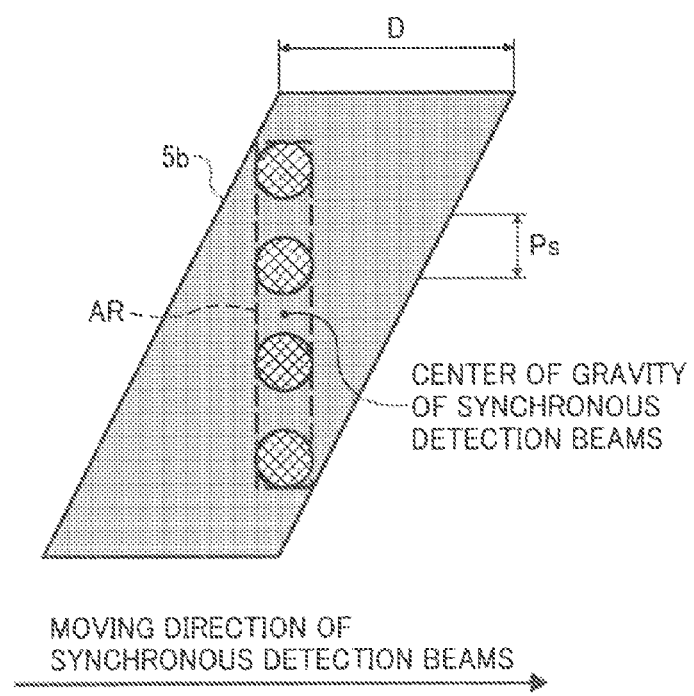
FIG. 31B is a view illustrating a second light-receiving unit of the synchronization detecting sensor.

In the embodiment, the second light-receiving unit 5b is the light-receiving unit in a parallelogram as one example and is arranged at the moving direction side of the plurality of beams for synchronization detection in the first light-receiving unit 5b. The length direction of the second receiving unit 5b is inclined by an angle θ (0<θ<90°) with respect to the length direction of the first light-receiving unit 5a within the light-receiving surface. In other words, two sides through which the plurality of beams for synchronization detection passes are inclined to the main scanning direction. As shown in FIG. 31B as one example, the size of the second light-receiving unit 5b is a size capable of covering the overall virtual area AR.

In other words, the second light-receiving unit 5b is set to satisfy a relation of $(n-1) \times Ps \times \tan \theta < D$ by using an interval Ps of the light spot of the plurality of beams for synchronization detection, a number n of the light spot, a width D with respect to the main scanning direction of the second light-receiving unit 5b in the light-receiving surface.

Figure 32:
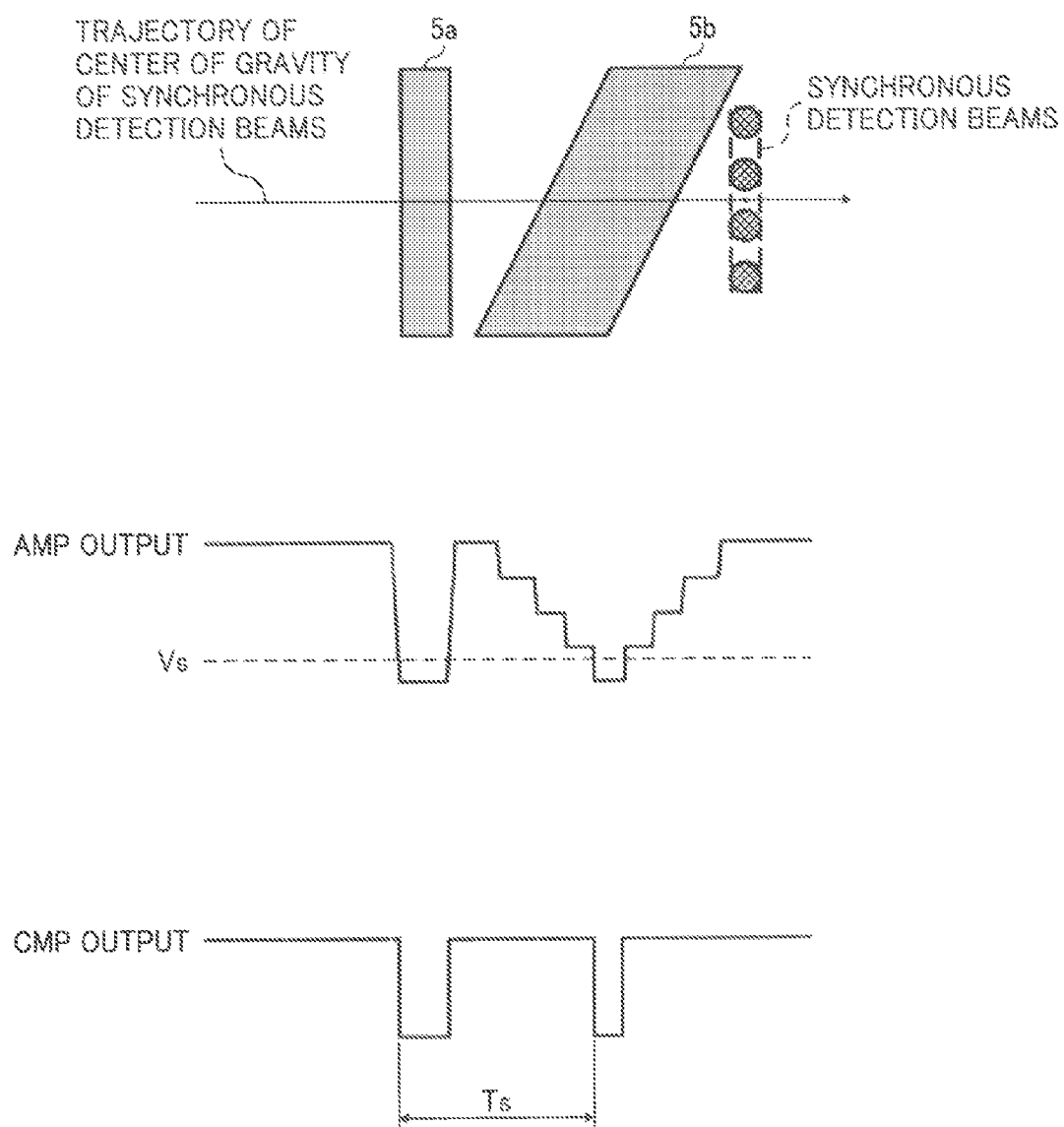
FIG. 32 is a view illustrating an operation of the synchronization detecting sensor.

The reference level Vs is set to a level slightly higher than the output signal level from the amplifier 5c when the light-receiving device receives all of the plurality of beams for synchronization detection. As shown in FIG. 32 as one example, when each light-receiving unit receives all of the plurality of beams for synchronization detection, the judgment results in the comparator 5d are varied so that the output signal from the comparator 5d is varied accordingly (see the equation (1)).

When the first light-receiving unit 5a receives the plurality of beams for synchronization detection, the falling in the output signal from the comparator 5d is not subjected to an influence of the sub-scanning deviation.

Figure 33:
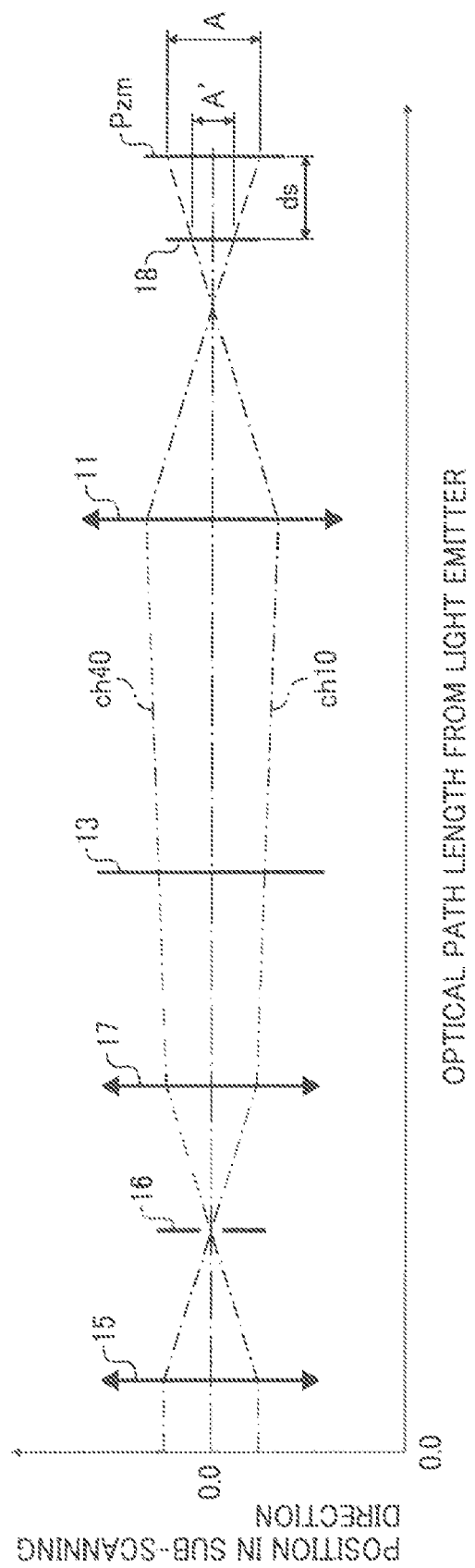
FIG. 33 is a view illustrating a position of the light-receiving surface of the synchronization detecting sensor.

FIG. 33 is a view showing, by way of example, an optical path for main light rays of beams (ch10) emitted from the light emitter v10 and an optical path for main light rays of beam (ch40) emitted from the light emitter v40. In FIG. 33, a reference numeral 11 represents the scanning optical system and a reference symbol Pzm represents a beam waist position of the plurality of beams for synchronization detection in the sub-scanning direction (a surface equivalent to the imaging plane).

As shown in FIG. 33, the main light rays of ch10 and the main light rays of ch40 are intersected with one another between the surface equivalent to the imaging plane and the scanning optical system with respect to the sub-scanning direction. The light-receiving surface of the synchronization detecting sensor 18 is arranged at a position shifted by ds to the intersecting position side from a position of the surface equivalent to the imaging plane. Thereby, regarding an interval of the main light rays of ch10 and the main light rays of ch40 with respect to the sub-scanning direction, an interval A' in the position of the light-receiving surface is smaller than an interval A in the position of the surface equivalent to the imaging plane. Therefore, regarding a size of the virtual area AR with respect to the sub-scanning direction, a size in the position of the light-receiving surface is smaller than a size in the position of the surface equivalent to the imaging plane.

The scanning controller obtains a scanning start timing from the falling in the output signal from the comparator 5d when the first light-receiving unit 5a receives the detection beam.

The printer controller 1060 applies voltage corresponding to the sub-scanning deviation to the liquid crystal deflecting device 20 to correct the deviation. For example, the printer controller 1060 determines the applied voltage to the liquid crystal deflecting device 20 so that the ΔTs is 0 in the photoconductor drum 1030. The relation of the ΔTs and the applied voltage is previously obtained and is stored in the memory (not shown).

The printer controller 1060 changes a light emitter of a light emitting object into a light emitter at the position spaced by a distance corresponding to the interval of the scanning line to a direction corresponding to the sub-scanning direction from the light emitter when the sub-scanning deviation is equal to or more than ½ of the interval of the scanning line in the photoconductor drum 1030, thereby correcting the sub-scanning deviation.

Figure 34A:
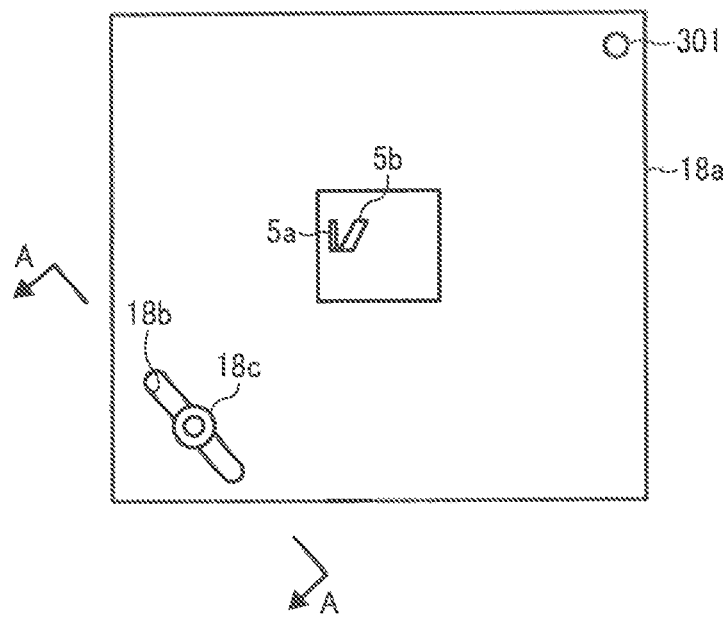
FIG. 34A is a view illustrating a configuration of a supporting member.
Figure 34B:
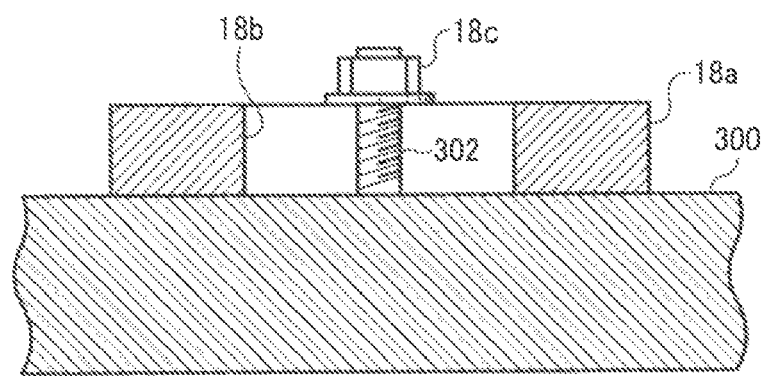
FIG. 34B is a cross-sectional view taken along line A-A of FIG. 34A.
Figure 35:
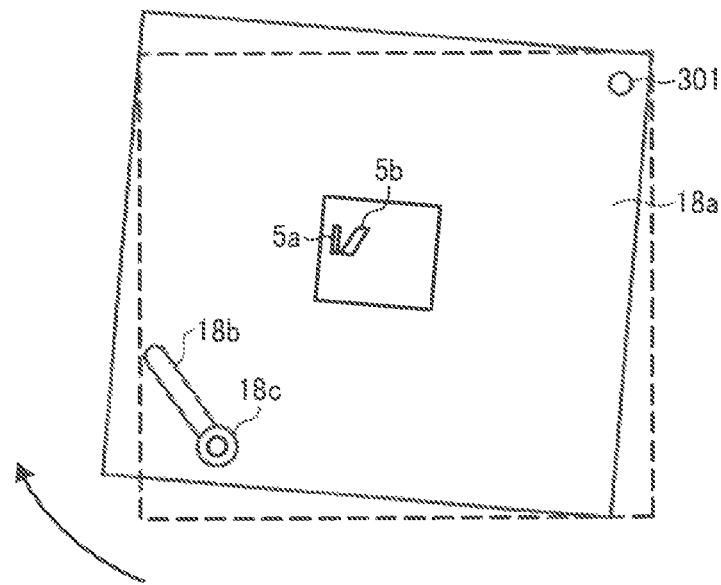
FIG. 35 is a view illustrating a rotating operation of the supporting member.

For example, as shown in FIG. 34A and FIG. 34B that is a cross-sectional view taken along line A-A of FIG. 34A, the synchronization detecting sensor 18 is fixed to a housing 300 of the laser scanning apparatus 1010 through a supporting member 18a in a rectangular plate shape.

In the supporting member 18a, a through hole is formed on one of four corners thereof and a pin 301 projected from the housing 300 is penetrated. A long hole 18b is formed on a diagonal position of the through hole and a pin 302 projected from the housing 300 is penetrated. A screw groove is formed on a surface of the pin 302 and if a nut 18c is fastened, the supporting member 18a is pressed to the housing 300. If the nut 18c is unfastened, it is possible for the supporting member 18a to rotate around an axis by a length of the long hole 18b about the pin 301. Thereby, it is possible for the synchronization detecting sensor 18 to perform an adjustment so that the length direction of the first light-receiving unit 5a is orthogonal to the moving direction of the plurality of beams for synchronization detection.

As can be appreciated from the explanation, in the laser scanning apparatus 1010 according to the present embodiment, the deflector is configured of the polygon mirror 13, the optical scanning system is configured of the deflector-side scanning lens 11a and the imaging plane-side scanning lens 11b, and the photo detector is configured of the synchronization detecting sensor 18.

A position correcting apparatus is configured of the printer controller 1060.

As described above, the laser scanning apparatus 1010 according to the present embodiment includes the light source 14 that has the plurality of light emitters, the polygon mirror 13 that deflects the beam from the light source 14, the scanning optical system that condenses the beam deflected in the polygon mirror 13 in the photoconductor drum 1030, and the synchronization detecting sensor 18 receiving the plurality of beams for synchronization detection deflected in the polygon mirror 13. The main light rays of the plurality of fluxes for synchronization detection are intersected with one another between the surface equivalent to the imaging plane and the scanning optical system with respect to the sub-scanning direction and the light-receiving surface of the synchronization detecting sensor 18 is arranged at the position shifted to the intersecting position side from the position of the surface equivalent to the imaging plane. Thereby, the size of the virtual area AR with respect to the sub-scanning direction becomes smaller than that when the light-receiving surface is arranged at the position of the surface equivalent to the imaging plane. Even when the passing position of the plurality of beams for synchronization detection deviates from a design value with respect to the sub-scanning direction due to the machining error or the assembling error of the optical system, it is possible for the synchronization detecting sensor 18 to receive the plurality of beams for synchronization detection as designed, i.e. to prevent out-of-synchronization. As a result, it is possible to accurately detect the synchronization signal without increasing costs.

If the reflected light from the light-receiving surface of the synchronization detecting sensor 18 reaches the light source 14 as the returned light, there is a risk of making the light intensity control unstable. However, in the present embodiment, since the normal direction of the light-receiving surface of the synchronization detecting sensor 18 is inclined to the incident direction of the plurality of beams for synchronization detection, it is possible to suppress the reflected light from the light-receiving surface of the synchronization detecting sensor 18 from reaching the light source 14 as the returned light.

According to the present embodiment, since the light-receiving surface of the synchronization detecting sensor 18 is optically almost parallel to the imaging plane, it is possible to make the scanning speed on the imaging plane and the scanning speed in the light-receiving surface the same. Since the position of the light-receiving surface of the synchronization detecting sensor 18 is shifted, although the scanning speed on the imaging plane and the scanning speed in the light-receiving surface are different, it is possible to make the scanning speed on the imaging plane and the scanning speed in the light-receiving surface the same by a multiplication of the coefficients according to the shifted amount.

According to the present embodiment, the synchronization detecting sensor 18 includes the light-receiving device having the first light-receiving unit 5a with the shape where the two sides through which the plurality of beams for synchronization detection passes are orthogonal to the main scanning direction and the second light-receiving unit 5b with the shape where the two sides through which the plurality of beams for synchronization detection passes are inclined to the main scanning direction. All the sizes of the first and the second light-receiving units are the sizes capable of covering the overall virtual area in the quadrangular shape surrounding the plurality of light spots in the light-receiving surfaces. Accordingly, each light-receiving unit is capable of assuring sufficient light intensity and the synchronization detecting sensor 18 is capable of outputting the signals with excellent S/N ratio. As a result, it is possible to accurately detect the positional deviation with respect to the sub-scanning direction of the light spots formed on the surface of the photoconductor drum 1030.

According to the present embodiment, since the plurality of light emitters parallely arranged in a line along the S direction are selected as the light emitters for detection, it is possible to make each light-receiving unit of the synchronization detecting sensor 18 small. As a result, it is possible to make the synchronization detecting sensor 18 small.

According to the present embodiment, since the synchronization detecting sensor 18 has a rotation mechanism that rotates within the light-receiving surface, it is possible to reduce the detection error.

According to the present embodiment, the margin on the assembly error is increased, making it possible to simplify the assembly process and the checking process and to reduce costs.

The printer 1000 according to the present embodiment includes the laser scanning apparatus 1010, making it possible to form high-quality image at high speed without increasing costs.

According to the present embodiment, the print controller 1060 applies the voltage corresponding to the sub-scanning deviation in the photoconductor drum 1030 to the liquid crystal deflecting device 20 to correct the deviation. Thereby, it is possible to maintain initial image quality and to prevent image degradation due to environment variations.

It is possible to form an information processing system that is capable of processing outputs from a plurality of devices with one image forming apparatus by a connection of the printer 100, an electronic arithmetic device (a compute, or the like), an image information communication system (a facsimile device, or the like), or the like via a network. If the plurality of image forming apparatuses are connected on the network, it is possible to know states (whether a job is congested, whether a power supply is turned on, whether a failure occurs, or the like) of each image forming apparatus from each output request and to perform the image formation by selecting the image forming apparatus in the optimal state (a state meeting a user demand).

The embodiment explains the synchronization detecting sensor 18 having the function that detects the sub-scanning deviation to detect the scanning start, but is not limited thereto. For example, when the sensor to detect the scanning end is installed, the sensor may have the function that detects the sub-scanning deviation. The sub-scanning deviation is obtained after and before the scanning. In this case, it is possible to obtain information on a curve of the scanning line.

The embodiment explains the first light-receiving unit 5a in the rectangular shape, but the first light-receiving unit 5a is allowed to have a shape where the two sides through which the plurality of beams for synchronization detection passes are intersected with the main scanning direction, without being limited thereto.

The embodiment explains the second light-receiving unit 5b in a parallelogram, but the second light-receiving unit 5b is allowed to have a shape where the two sides through which the plurality of beams for synchronization detection passes is inclined to the main scanning direction, without being limited thereto.

Figure 36:
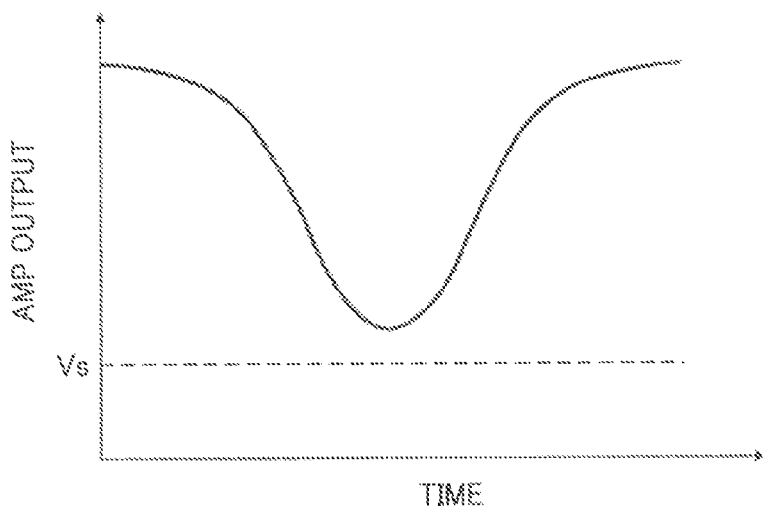
FIG. 36 is a view illustrating a thickening of the plurality of beams for synchronization detection.
Figure 37:
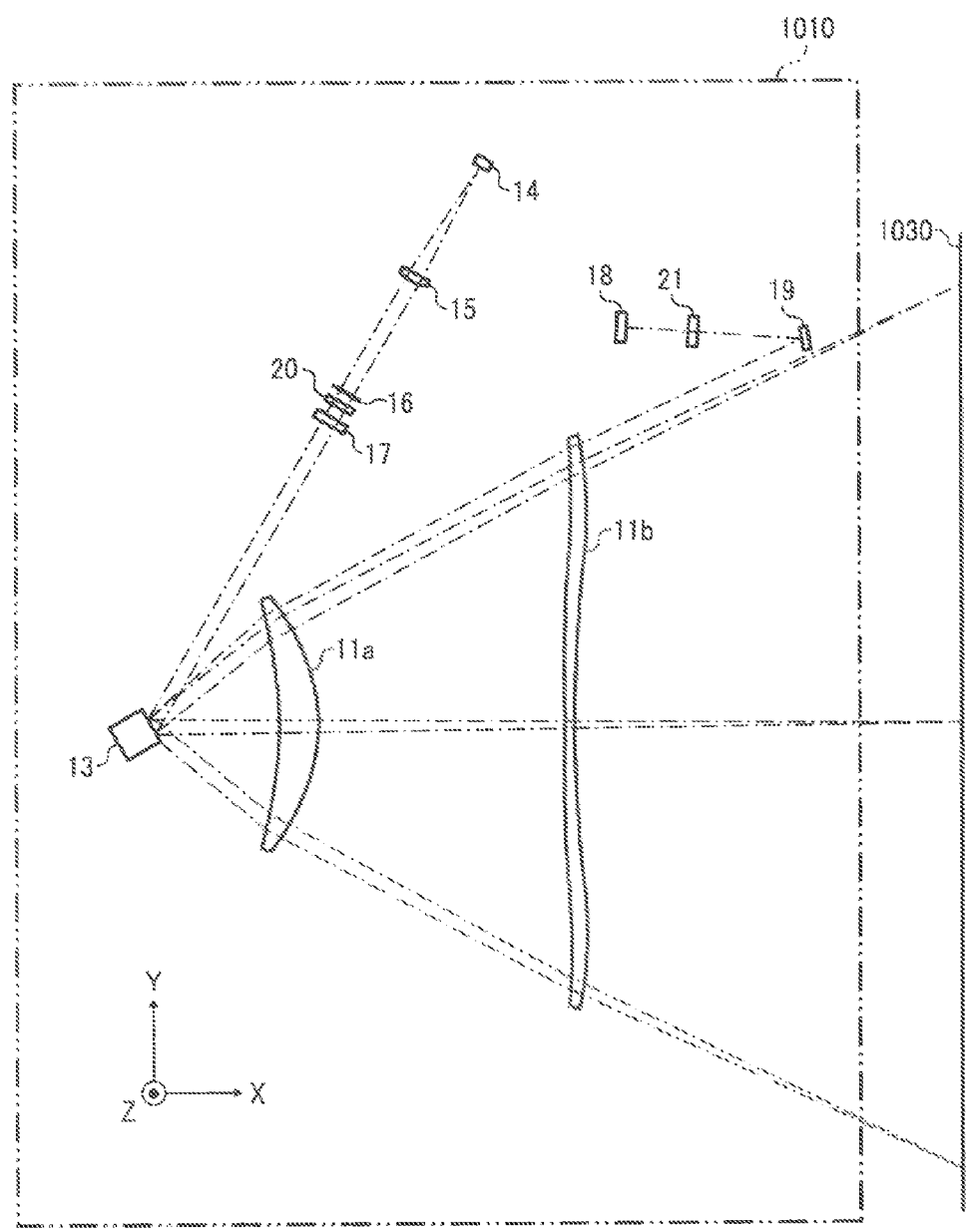
FIG. 37 is a view illustrating a configuration of the laser scanning apparatus having a condensing optical device that condenses the plurality of beams for synchronization detection.

As shown in FIG. 36 as one example, in the embodiment, when the diameter of the plurality of beams for synchronization detection is thick and the minimum level of the output signal from the amplifier 5c is higher than the reference level Vs, as shown in FIG. 37 as one example, the condensing optical device 21 having power at least to the main scanning direction may be arrange between the mirror 19 for synchronization detection and the synchronization detecting sensor 18. It is possible to use a lens or a mirror, etc. as the condensing optical device 21. Thereby, the spot diameter of the plurality of beams for the synchronization detection at least with respect to the main scanning direction is thin, making it possible to reduce the minimum level of the output signal from the amplifier 5c to be lower than the reference level Vs. The power of the condensing optical device 21 is determined according to the shift amount ds of the light-receiving surface of the synchronization detecting sensor 18. The imaging position of the plurality of beams for synchronization detection is corrected to a proper position.

The embodiment explains the light source 14 having the forty light emitters, but the light source 14 is allowed to have any number of the plurality of light emitters without being limited thereto. The plurality light emitters is allowed to be arranged one-dimensionally.

The embodiment explains the case where the four light emitters v10, v20, v30, v40 parallely arranged in a line along the S direction are selected as the light emitters for detection, but is not limited thereto.

The embodiment explains the main light rays of the plurality of beams for synchronization detection that are intersected with one another between the surface equivalent to the imaging plane and the scanning optical system with respect to the sub-scanning direction, but the main light rays of the plurality of beams for synchronization detection may not be intersected with one another between the surface equivalent to the imaging plane and the scanning optical system with respect to the sub-scanning direction. For example, the light-receiving surface of the synchronization detecting sensor 18 may be arranged at the position shifted to the direction near the polygon mirror 13 from the position of the surface equivalent to the imaging plane when the main light rays of the plurality of beams for synchronization detection have an increasing interval with respect to the sub-scanning direction and are directed to the synchronization detecting sensor 18, making it possible to obtain the same effect as the embodiment.

For example, the light-receiving surface of the synchronization detecting sensor 18 may be arranged at the position shifted to the direction away from the polygon mirror 13 from the position of the surface equivalent to the imaging plane when the main light rays of the plurality of beams for synchronization detection have a decreasing interval with respect to the sub-scanning direction and are directed to the synchronization detecting sensor 18, making it possible to obtain the same effect as the embodiment.

The light-receiving surface of the synchronization detecting sensor 18 is allowed to be arranged at the position shifted in the direction which makes the interval of the main light rays of the plurality of beams for synchronization detection small with respect to the sub-scanning direction and the position of the surface equivalent to the imaging plane. The size of the virtual area AR with respect to the sub-scanning direction becomes smaller than that when the light-receiving surface is arranged at the position of the surface equivalent to the imaging plane.

The embodiment explains the printer 1000 as the image forming apparatus, but is not limited thereto. If the image forming apparatus includes the laser scanning apparatus 1010, it is possible to form high-quality image at high speed.

For example, the image forming apparatus, which includes the laser scanning apparatus 1010, may directly irradiate a coloring medium (recording paper) colored by a laser beam, with the laser beam.

The image forming apparatus may use a silver salt film as the image carrier. In this case, the latent images are formed on the silver salt film by the light scanning, making it possible to make the latent images visible with the same processing as the developing processing in the general silver salt photograph process. It is possible to transfer the image to the photographic paper with the same processing as a burning processing in the general silver salt photograph process. It is possible for the image forming apparatus to be practiced as a laser printmaking apparatus, or a laser drawing apparatus that draws a CT scanner image, etc.

Even in the image forming apparatus that forms the multicolor image, by using the laser scanning apparatus corresponding to the color image, it is possible to form high-quality image at high speed (for example, see FIGS. 1 and 8)

Figure 38:
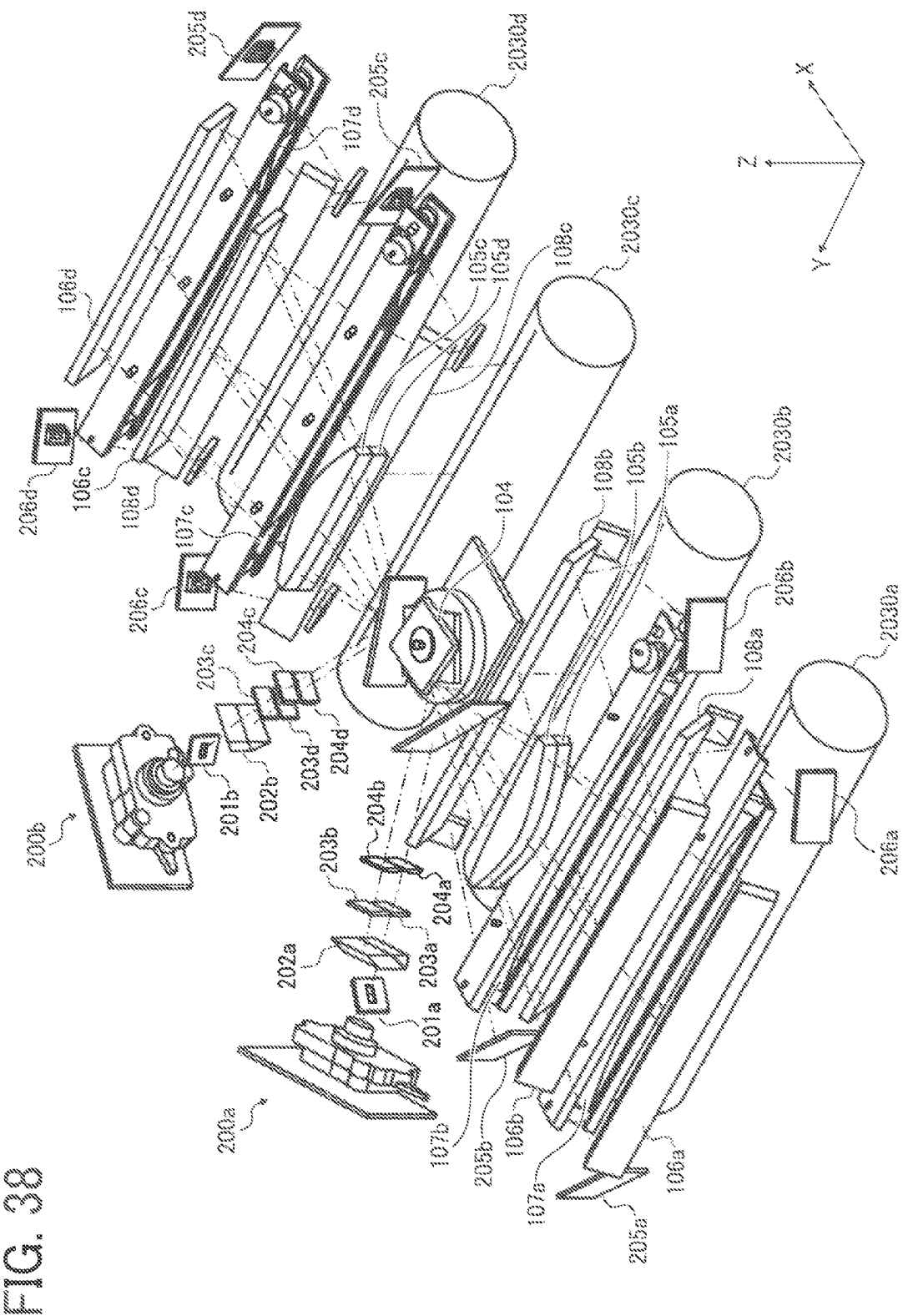
FIG. 38 is a perspective view showing another configuration example of the laser scanning apparatus.

The laser scanning apparatus is allowed to have a configuration of FIG. 38 as one example.

As shown in FIG. 38, the laser scanning apparatus includes the two light source units 200a and 200b, the two opening plates 201a and 201b, the two beam splitting prisms 202a and 202b, the polygon mirror 104, the four liquid crystal deflecting devices 203a, 203b, 203c, and 203d, the four cylinder lenses 204a, 204b, 204c, and 204d, the four fθ lenses 105a, 105b, 105c, and 105d, the eight folding mirrors 106a, 106b, 106c, 106d, 108a, 108b, 108c, and 108d, the four troidal lenses 107a, 107b, 107c, and 107d, the four synchronization detecting sensors 205a, 205b, 205c, and 205d, and a scanning controller (not shown), etc.

As described above, the laser scanning apparatus of the present invention is suitable for accurately detecting the synchronization signal without increasing costs. The image forming apparatus of the present invention is suitable for forming high-quality image at high speed without increasing costs.

Hereinafter, a third embodiment of the present invention will be explained.

The third embodiment uses the same configuration as the image forming apparatus and the laser scanning apparatus explained in the second embodiment and therefore, will be described with reference to other examples.

Figure 39:
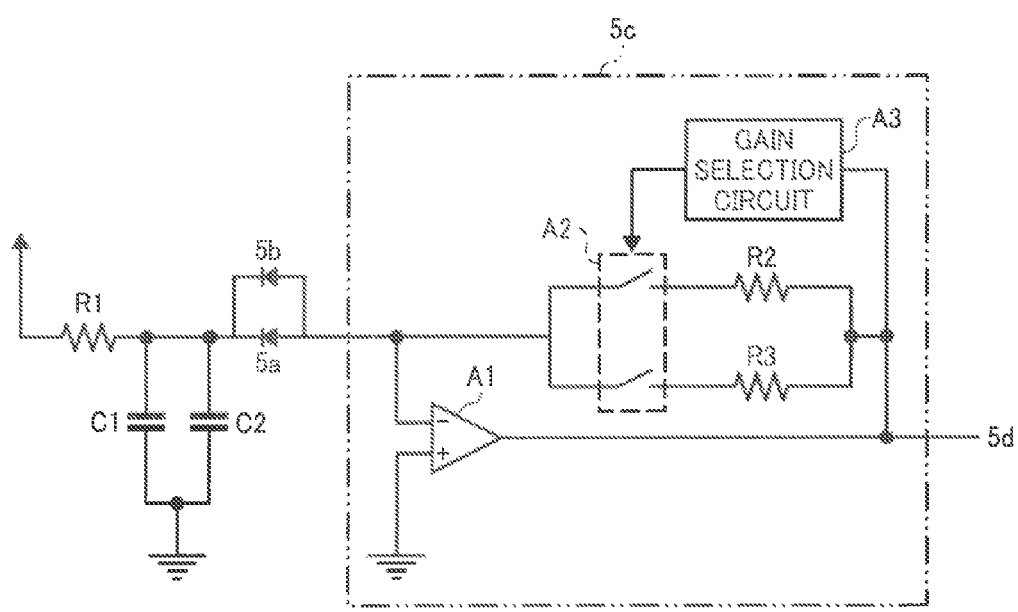
FIG. 39 is a circuit view showing an amplifier configuration having a gain selection circuit.

In the second embodiment, the amplifier 5c makes amplified rate that amplifies the output signal from the light-receiving device larger when the detection beam is received in the second light-receiving unit 5a than when the detection beam is received in the first light-receiving unit 5b. In this case, as shown in FIG. 39 as one example, the amplifier 5c includes an operational amplifier A1, a switch circuit A2, a gain selection circuit A3, and feedback resistors R2 and R3 (R3>R2). The gain selection circuit A3 outputs a select signal, which selects any one of the feedback resistors R2 and R3, based on an output level from the operational amplifier A1. The switch circuit A2 selects any one of the feedback resistors R2 and R3 according to the select signal from the gain selection circuit A3. The switch circuit A2 is allowed to have an analog switch opened and closed according to the select signal and an analog switch opened and closed according to a signal inverting the select signal.

Figure 40:
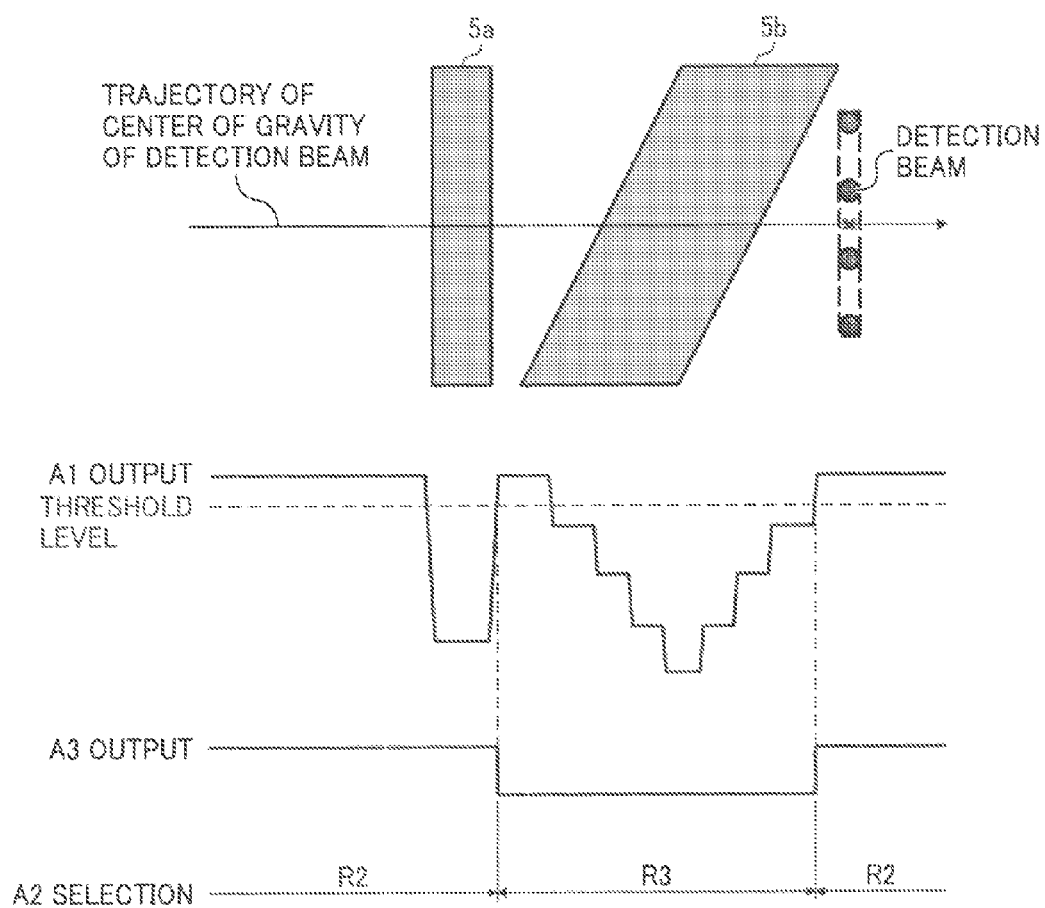
FIG. 40 is a view illustrating an action of the amplifier of FIG. 39.

As shown in FIG. 40 as one example, if the level of the rising signal reaches a preset threshold level when the detection beam is received in the first light-receiving unit 5a, the gain selection circuit A3 makes the output level of the select signal a low level and if the level of the rising signal reaches the preset threshold level when the detection beam is received in the second light-receiving unit 5b, the gain selection circuit A3 makes the output level of the select signal a high level. The switch circuit A2 selects the feedback resistor R2 when the select signal is the high level and selects the feedback resistor R3 when the select signal is the low level.

Figure 41:
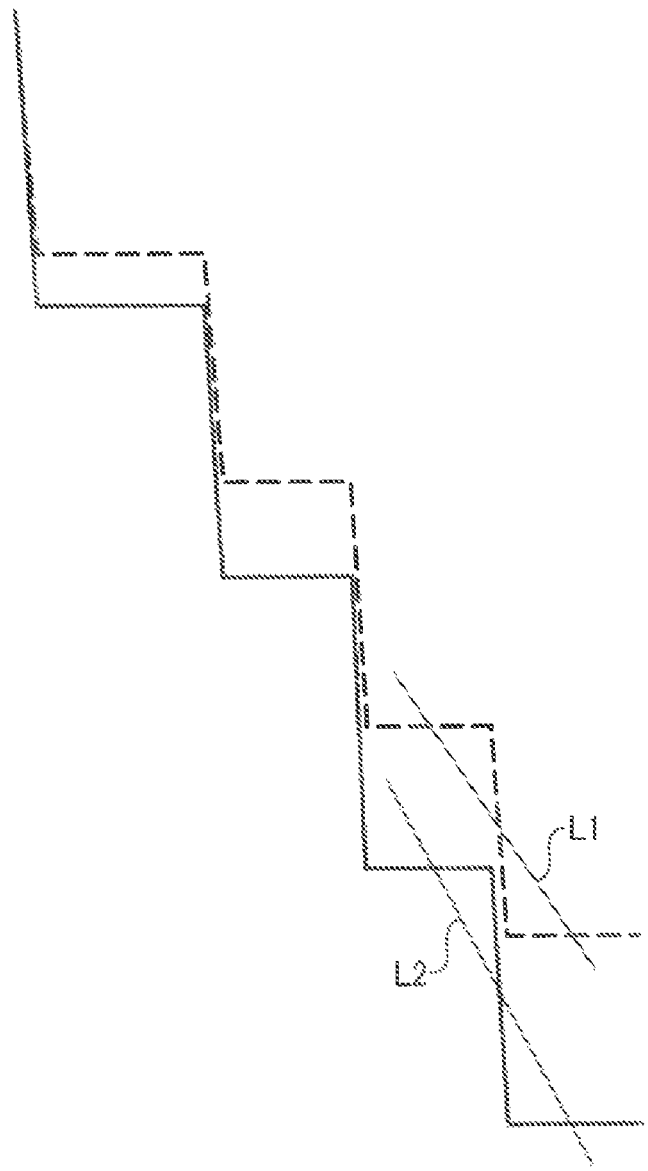
FIG. 41 is a view illustrating an effect of the amplifier of FIG. 39.

As shown in FIG. 41 as one example, a falling slope L2 of the output signal from the light-receiving device when the detection beam is received in the second light-receiving unit 5b is steeper than a slope L1 at the time of the embodiment. It is possible to suppress the fluctuation in the falling timing in output signal from the comparator 5d. In other words, it is possible to improve the detection precision.

In the embodiment, the sensitivity of the second light-receiving unit 5b is allowed to be larger than the first light-receiving unit 5a. Thereby, it is possible to improve the detection precision.

Figure 42A:
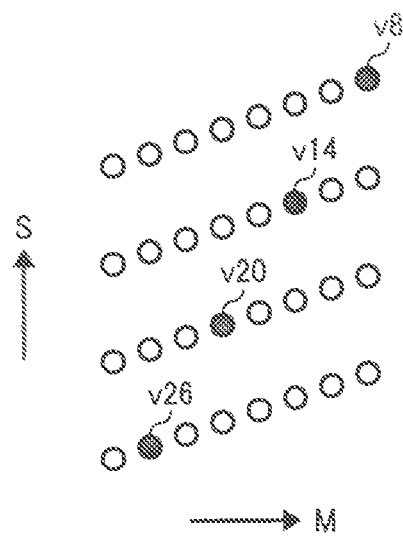
FIG. 42A is a view illustrating another example of the light emitter for detection selected when passing through the second light-receiving unit.
Figure 42B:
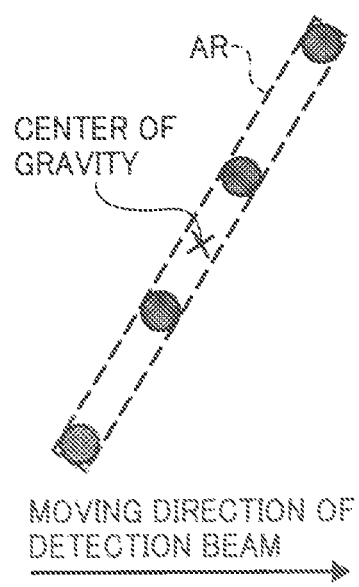
FIG. 42B is a view illustrating the light spots of the detection beam in the light-receiving surfaces at that time.

The embodiment explains all the detection beam when passing through the first light-receiving unit 5a and the detection beam when passing through the second light-receiving unit 5b that are formed of the plurality of light beams parallely arranged in a line to the direction orthogonal to the main sub-scanning direction, but is allowed to have the detection beam when passing through the second light-receiving unit 5b that is formed of the plurality of light beams parallely arranged in a line to the direction almost parallel to the length direction of the second light-receiving unit 5b as shown in FIGS. 42A and 42B, without being limited thereto.

In this case, the main controller 210 selects the four light emitters v8, v16, v24, and v32 as the light emitters for detection when passing through the first light-receiving unit 5a and selects the four light emitters v8, v14, v20, and v26 when passing through the second light-receiving unit 5b.

In this case, it is possible to make the length of the main scanning direction of the second light-receiving unit 5b smaller than that in the embodiment.

As a result, as shown in FIG. 43 as one example, it is possible to make the variation in the output signal from the second light-receiving unit 5b sharp when the detection beam is received in the second light-receiving unit 5b. In other words, it is possible to improve the detection precision.

Figure 44:
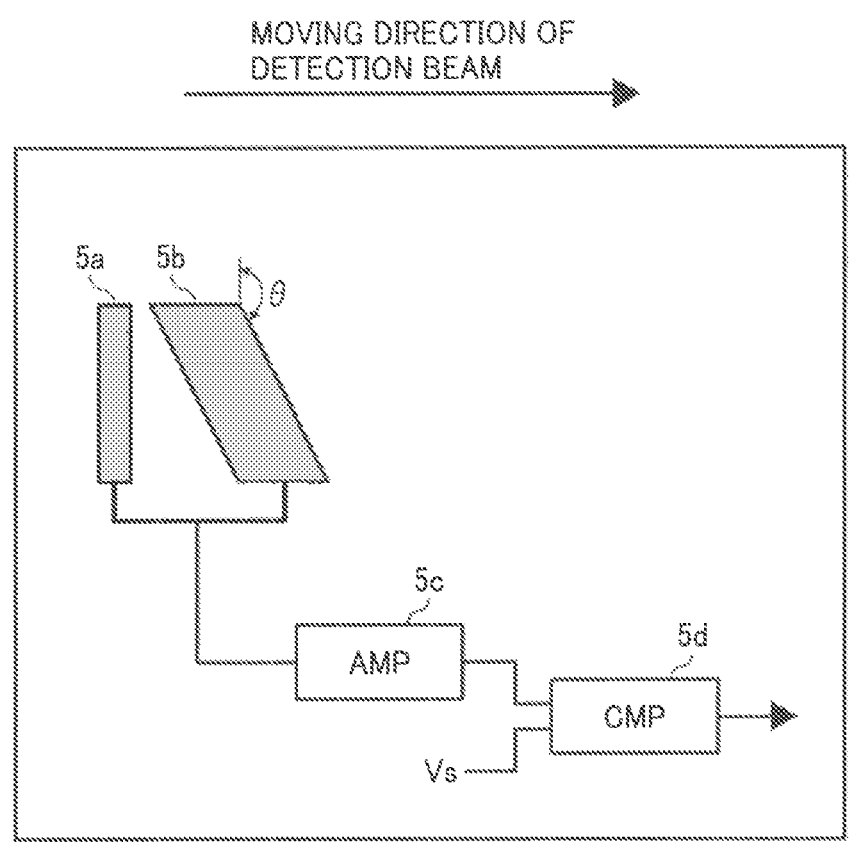
FIG. 44 is a view illustrating a modification of the synchronization detecting sensor before scanning.

As shown in FIG. 44 as one example, in the embodiment, the second light-receiving unit 5b is allowed to be arranged at an angle larger than 90°. Even in this case, if the relation $0<|(n-1)\times Ps\times \tan\theta|<D$ is satisfied, it is possible to obtain the same effect as the embodiment.

In the embodiment, the light source unit for every color is allowed to be installed. In other words, the four light source units may be installed.

The embodiment explains the color printer of a tandem type as the image forming apparatus, but is not limited thereto. For example, even in the image forming apparatus (a duplicator, a facsimile, a multifunction product having the functions) other than the printer, if the image forming apparatus includes the laser scanning apparatus, it is capable of forming high-quality image at high speed without increasing costs.

The image forming apparatus is allowed to use the coloring medium (positive photographic paper), which is colored by heat energy of beam spots, as an image carrier. In this case, the visible image can be directly formed on the image carrier by the light scanning.

The embodiment explains the multicolor printer as the image forming apparatus, but is not limited thereto. Even in the monochromatic image forming apparatus, it is capable of forming high-quality image at high speed without increasing costs by including the laser scanning apparatus having the synchronization detecting sensor before scanning.

As described above, the laser scanning apparatus of the present invention is suitable for accurately detecting the positional deviation with respect to the sub-scanning direction of the light spots formed on the surface to be scanned without increasing costs. The image forming apparatus of the present invention is suitable for forming high-quality image at high speed without increasing costs.

According to the embodiment, the photo detector to which the plurality of light beams passing through the scanning optical system are incident while moving in the main scanning direction includes at least one light-receiving device having the first light-receiving unit and the second light-receiving unit, which in the light-receiving surfaces, have the different intervals from each other in the main scanning direction depending on the position of the direction orthogonal to the main scanning direction. All the sizes of the first and the second light-receiving units are sizes capable of covering the overall virtual area in the quadrangular shape surrounding the plurality of light spots in the light-receiving surface of the photo detector. Accordingly, each light-receiving unit is capable of assuring sufficient light intensity and the photo detector is capable of outputting signals with excellent signal-to-noise (S/N) ratio. As a result, the present invention has an effect of accurately detecting the positional deviation with respect to the sub-scanning direction of the light spots formed on the surface to be scanned without increasing costs.

Since the image forming apparatus according to one aspect of the present invention includes the laser scanning apparatus of the present invention, it has an effect of forming a high-quality image at high speed without increasing costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A laser scanning apparatus, comprising:
   a light source unit including a plurality of light emitters, the plurality of light emitters being two-dimensionally arranged;
   a controller configured to select a subset of at least three of the plurality of light emitters, but less than all of the plurality of light emitters, to generate detection light beams;
   a deflector for deflecting the detection light beams from the light source unit;
   a scanning optical system for condensing the detection light beams deflected by the deflector on a surface to be scanned; and
   a photo detector to which a the detection light beams, which are deflected by the deflector and pass through the scanning optical system, are incident while moving in a main scanning direction, and which includes at least one light-receiving device having a first light-receiving unit and a second light-receiving unit, the first light-receiving unit and the second light-receiving unit being placed in different intervals from each other in the main scanning direction depending on a position in a direction orthogonal to the main scanning direction in a light-receiving surface, wherein
   every size of the first and the second light-receiving units is a size covering an overall virtual area in a quadrangular shape surrounding a plurality of light spots arranged two-dimensionally in the light-receiving surface of the photo detector, the plurality of light spots being a plurality of spots of the detection light beams.

2. The laser scanning apparatus according to claim 1, wherein the second light-receiving unit is inclined to the first light-receiving unit in the light-receiving surface of the photo detector.

3. The laser scanning apparatus according to claim 1, further comprising a light intensity controller for controlling light intensity of the detection light beams within a preset range.

4. The laser scanning apparatus according to claim 1, wherein the photo detector includes a comparator for comparing an output level from the at least one light-receiving device with a reference level to output a result of comparison, and the reference level is a change level in the output from the comparator when the at least one light-receiving device receives all of the detection light beams.

5. The laser scanning apparatus according to claim 1, further comprising:
a liquid crystal deflection device that is arranged on an optical path to the surface to be scanned and deflects an incident beam to a sub-scanning direction according to an applied voltage; and
a position correcting unit that controls the applied voltage based on the output signals from the photo detector and corrects a positional deviation with respect to the sub-scanning direction of light spots in the surface to be scanned.

6. The laser scanning apparatus according to claim 1, wherein the photo detector includes a first light-receiving device and a second light-receiving device, wherein
the first light-receiving units of the first and the second light-receiving devices are arranged adjacent to each other in the main scanning direction, wherein
the second light-receiving units of the first and the second light-receiving devices are arranged adjacent to each other in the main scanning direction.

7. The laser scanning apparatus according to claim 1, wherein each main light ray of beams for synchronization detection deflected by the deflector is directed to the photo detector while increasing or reducing the intervals therebetween with respect to the sub-scanning direction, wherein
the light-receiving surface of the photo detector is arranged at a position shifted to a direction making the intervals of the each main light ray smaller with respect to a beam waist position of the beams for synchronization detection in the sub-scanning direction.

8. The laser scanning apparatus according to claim 7, wherein the each main light ray is intersected between a surface equivalent to an imaging plane and the scanning optical system with respect to the sub-scanning direction, wherein
the direction making the intervals of each main light ray smaller is a direction closer to the deflector.

9. The laser scanning apparatus according to claim 7, further comprising an optical device having power at least in the main scanning direction on the optical path of the beams for synchronization detection between the deflector and the photo detector.

10. The laser scanning apparatus according to claim 7, wherein a normal direction of the light-receiving surface of the photo detector is inclined to an incident direction of the beams for synchronization detection.

11. The laser scanning apparatus according to claim 7, wherein the light-receiving surface of the photo detector is optically almost parallel to the imaging plane.

12. The laser scanning apparatus according to claim 7, wherein the beams for synchronization detection travel in a line in a direction orthogonal to the main scanning direction, wherein
the photo detector includes the light-receiving device having the first light-receiving unit with a shape where two sides through which the beams for synchronization detection pass are orthogonal to the main scanning direction, and the second light-receiving unit with a shape where two sides through which the beams for synchronization detection pass are inclined to the main scanning direction, wherein the size of the first and the second light-receiving units is a size covering an overall virtual area in a quadrangular shape surrounding the light spots of the beams for synchronization detection in the light-receiving surface of the photo detector.

13. The laser scanning apparatus according to claim 12, further comprising a rotation mechanism for rotating the light-receiving device within the light-receiving surface.

14. The laser scanning apparatus according to claim 12, wherein the light beams travel in the same intervals with respect to the direction orthogonal to the main scanning direction, wherein
a relation of $0<(n-1)\times Ps\times\tan\theta<D$ is satisfied, where Ps is the interval, n is the number of the light beams, $\theta$ is an inclined angle to the first light-receiving unit of the two sides of the second light-receiving unit, and D is a width with respect to the main scanning direction of the second light-receiving unit.

15. The laser scanning apparatus according to claim 1, wherein the photo detector further includes an amplifier for amplifying an output signal of the light-receiving device; and
an amplified rate of the amplifier when the light beams are received by the second light-receiving unit is larger than that when the light beams are received by the first light-receiving unit.

16. The laser scanning apparatus according to claim 1, further comprising a light emitter selecting unit for selecting the light emitter which is allowed to emit light so that the light beams travel in a line in a direction orthogonal to the main scanning direction when passing through the first light-receiving unit and that the light beams travel in a line in a direction substantially parallel to the second light-receiving unit inclined to the main scanning direction when passing through the second light-receiving unit.

17. The laser scanning apparatus according to claim 1, further comprising a position correcting unit for correcting a positional deviation with respect to the sub-scanning direction of the light spot in the surface to be scanned based on an output signal of the photo detector.

18. The laser scanning apparatus of claim 1, where the light source unit is a vertical cavity surface emitting laser (VCSEL).

19. The laser scanning apparatus of claim 1, wherein at least one light spot is arranged between the plurality of spots of the detection light beams.

20. The laser scanning apparatus of claim 1, wherein the plurality of light emitters are arranged at regular intervals from each other.

21. A laser scanning apparatus, comprising:
at least one light source unit including a plurality of light emitters, the plurality of light emitters being two-dimensionally arranged;
a controller configured to select a subset of at least three of the plurality of light emitters, but less than all of the plurality of light emitters, to generate detection light beams;
a deflector for deflecting the detection light beams from the at least one light source unit;
a scanning optical system for condensing the detection light beams deflected by the deflector on a plurality of surfaces to be scanned; and
a plurality of photo detectors provided corresponding respectively to the plurality of surfaces to be scanned, wherein the detection light beams which are deflected by the deflector and pass through the scanning optical system are incident to each photo detector while moving in a main scanning direction, wherein the photo detector includes at least one light-receiving device having a first light-receiving unit and a second light-receiving unit, wherein the first light-receiving unit and the second light-receiving unit are placed in different intervals from each other in the main scanning direction depending on a position in a direction orthogonal to the main scanning direction in a light-receiving surface, wherein every size of the first and the second light-receiving units is a size covering an overall virtual area in a quadrangular shape surrounding a plurality of light spots arranged two-dimensionally in the light-receiving surface of the photo detector, the plurality of light spots being a plurality of spots of the detection light beams.

22. An image forming apparatus, comprising:

at least one image carrier; and a laser scanning apparatus for scanning beams including image information on the at least one image carrier, the laser scanning apparatus including a light source unit including a plurality of light emitters, the plurality of light emitters being two-dimensionally arranged;

a controller configured to select a subset of at least three of the plurality of light emitters, but less than all of the plurality of light emitters, to generate detection light beams;

a deflector for deflecting the detection light beams from the light source unit;

a scanning optical system for condensing the detection light beams deflected by the deflector on a surface to be scanned; and a photo detector to which the detection light beams which are deflected by the deflector and pass through the scanning optical system are incident while moving in a main scanning direction, and which includes at least one light-receiving device having a first light-receiving unit and a second light-receiving unit, the first light-receiving unit and the second light-receiving unit being placed in different intervals from each other in the main scanning direction depending on a position in a direction orthogonal to the main scanning direction in a light-receiving surface, wherein every size of the first and the second light-receiving units is a size covering an overall virtual area in a quadrangular shape surrounding a plurality of light spots arranged two-dimensionally in the light-receiving surface of the photo detector, the plurality of light spots being a plurality of spots of the detection light beams.

* * * * *